(12) United States Patent
Mizutani et al.

(10) Patent No.: US 8,470,254 B2
(45) Date of Patent: Jun. 25, 2013

(54) HONEYCOMB FILTER AND METHOD FOR PRODUCING HONEYCOMB FILTER

(75) Inventors: Takashi Mizutani, Tokoname (JP); Shingo Iwasaki, Gifu (JP); Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/239,898

(22) Filed: Sep. 22, 2011

(65) Prior Publication Data

US 2012/0009092 A1    Jan. 12, 2012

Related U.S. Application Data

(63) Continuation of application No. PCT/JP2010/053149, filed on Feb. 26, 2010.

(30) Foreign Application Priority Data

Mar. 26, 2009 (JP) ................................ 2009-076142

(51) Int. Cl.
   *B01D 50/00* (2006.01)
(52) U.S. Cl.
   USPC .......................................... 422/177; 422/180
(58) Field of Classification Search
   USPC .................... 422/177, 180; 428/116; 502/423
   See application file for complete search history.

(56) References Cited

U.S. PATENT DOCUMENTS

| | | | |
|---|---|---|---|
| 5,114,581 A | 5/1992 | Goldsmith et al. | |
| 7,179,430 B1 | 2/2007 | Stobbe et al. | |
| 7,524,350 B2 * | 4/2009 | Kunieda | .......................... 55/523 |
| 2007/0204580 A1 | 9/2007 | Kunieda | |
| 2010/0011726 A1 | 1/2010 | Ishikawa | |

FOREIGN PATENT DOCUMENTS

| | | |
|---|---|---|
| EP | 2 174 698 | 4/2010 |
| JP | 63-240912 | 6/1988 |
| JP | 2002-519186 | 7/2002 |
| JP | 2004-340023 | 12/2004 |
| JP | 2006-007117 | 1/2006 |
| JP | 2607898 | 11/2006 |
| JP | 2010-29848 | 2/2010 |
| JP | 2010-111567 | 5/2010 |
| WO | 2006-041174 | 4/2006 |
| WO | 2008/066167 | 6/2008 |

\* cited by examiner

*Primary Examiner* — Tom Duong
(74) *Attorney, Agent, or Firm* — Burr & Brown

(57) ABSTRACT

There is provided a honeycomb filter wherein particles having an average particle diameter smaller that of the particles constituting partition walls are deposited at least in open pores formed by the particles constituting the partition walls and/or gaps between the particles in a surface layer portion of the partition walls on the exhaust gas inflow side, thereby forming a composite region. The average pore diameter of the partition walls is 5 to 40 μm, and the porosity of the partition wall is 35 to 75%. The particles to be deposited have an average particle diameter of 1 to 15 μm, and the height of the composite region is not more than 80 μm in the direction from the outermost contour line of the partition walls to the surface of the partition walls.

16 Claims, 12 Drawing Sheets

HONEYCOMB FILTER AND METHOD FOR PRODUCING HONEYCOMB FILTER

BACKGROUND OF THE INVENTION

1. Field of the Invention

The present invention relates to a honeycomb filter used for trapping or cleaning up particulates contained in exhaust gas discharged from an internal combustion engine such as a diesel engine or various combustion apparatuses and to a method for producing the honeycomb filter.

2. Description of Related Art

A large mount of particulate matter (hereinbelow referred to as "particulate matter", "particulates", or "PM") anchored by soot (graphite) is contained in exhaust gas discharged from an internal combustion engine such as a diesel engine or various combustion apparatuses (hereinbelow appropriately referred to as "internal combustion engine and the like"). Since environmental pollution is caused when the particulates are released without change into the atmosphere, it is general that a filter for trapping particulates is mounted in the exhaust gas passage from the internal combustion engine or the like.

An example of the filter used for such a purpose is a honeycomb filter having a honeycomb-structured body having a plurality of cells separated by partition walls formed of porous ceramic having a large number of pores and functioning as exhaust gas passages with one side open end portions and the other side open end port ions of plural cells being alternately plugged with plugging portions. In such a honeycomb filter, when exhaust gas is sent into the exhaust gas inflow cells (cells not plugged on the exhaust gas inflow side), particulates in the exhaust gas are trapped when exhaust gas passes through the partition walls, and purified gas from which the particulates are removed is discharged from the purified gas outflow cells (cells not plugged on the exhaust gas outflow side).

However, in such a conventional honeycomb filter, there arises a problem of easily causing pressure loss in the partition walls in accordance with a deposition mode of soot or ash. In particular, in order to reduce pressure loss to improve the trapping efficiency, it is effective to impart properties of pores having a small average pore diameter to a honeycomb filter. However, when a layer having such properties is formed on the partition walls of the honeycomb filter, pressure loss of the partition walls is increased when the exhaust gas passes through the partition walls at high flow rates. Therefore, in a conventional honeycomb filter, it is difficult to realize improvement in purification performance and regeneration efficiency simultaneously with planning the reduction of pressure loss.

For the aforementioned problems, there are the following Patent Documents 1 and 2.

The Patent Document 1 discloses a ceramic filter "provided with a fine particle portion having an average pore diameter of 1 to 10 µm and a thickness of at least 10 times the average pore diameter on a surface on one side of a support layer formed of a ceramic filter porous body" for the purpose of providing "a ceramic filter for exhaust gas, the filter having little change of pressure loss with the passage of time after trapping and high trapping efficiency and being excellent on practical side.

The Patent Document 2 discloses a "surface filter for fine particles, the filter having passages selectively clogged and a micro porous membrane imparted to the surfaces of the passages, being formed of a porous honeycomb monolith structure, and being regenerable by reverse flushing" for the purpose of providing "a new filtering apparatus regenerable by a reverse flushing treatment".

However, the Patent Documents 1 and 2 aim to improve PM-trapping performance by forming a layer having an average pore diameter smaller than that of the partition walls on the partition walls. In such a case, the opening of the cell on the exhaust gas inflow side as an inlet channel becomes small for the thickness of the layer formed therein. Therefore, there arises a problem of remarkable increase in the pressure loss of the partition walls particularly when the exhaust gas passes through the partition walls at high flow rates. On the other hand, reduction of the thickness of the partition wall can be considered for avoiding the problem. However, since thermal capacity is reduced when the thickness of the partition walls is reduced, and inlet temperature (temperature of the exhaust gas inflow side end face in the honeycomb filter) may be varied upon regeneration to become higher than the target temperature. In such a case, since quick combustion of soot may be caused to sharply raise the temperature inside the honeycomb filter, a crack may easily be caused in the honeycomb filter.

As described above, a response to the conventional problems is still insufficient even by the Patent Documents 1 and 2, and a solution in the early stages is desired.

PRIOR ART DOCUMENT

Patent Document

Patent Document 1: JP-A-63-240912
Patent Document 2: Japanese Utility Model Registration No. 2607898.

SUMMARY OF THE INVENTION

The present invention has been made in view of the aforementioned prior art problems and aims to provide a honeycomb filter capable of reducing pressure loss of the partition walls when exhaust gas passes through the partition walls at high flow rates with obtaining the same effect as in the layer formed on the partition walls by forming, at least in open pores formed by the particles constituting the partition walls and/or gaps between the particles, a composite region by depositing particles having an average particle diameter smaller than that of the aforementioned particles in a surface layer portion of the partition walls on the exhaust gas inflow side, allowing the partition walls to have an average pore diameter of 5 to 40 µm and a porosity of 35 to 75%, allowing the particles deposited to have an average particle diameter of 1 to 15 µm, and allowing the composite region to have a height of 80 µm or less with respect to the partition wall surface direction from the outermost contour line of the partition walls; and a method for producing the honeycomb filter. In addition, the present invention aims to provide a honeycomb filter improving regeneration efficiency with improving purification performance, a honeycomb filter improving high trapping efficiency with reducing pressure loss due to the adhesion of soot, and a honeycomb filter reducing the pressure loss after ash deposition; and a method for producing the honeycomb filter.

According to the present invention, there are provided the following honeycomb filter and method for producing the honeycomb filter.

According to a first aspect of the present invention, a honeycomb filter is provided, comprising a honeycomb-structured substrate provided with a plurality of cells separated by partition walls of porous ceramic having pores and functioning as exhaust gas passages, the honeycomb-structured substrate having an exhaust gas inflow side and an exhaust gas outflow side, wherein plugging portions are formed alternately in one side open end portions and the other side open end portions of the plural cells, at least in open pores formed by the particles constituting the partition wall and/or gaps between the particles, a composite region is formed by depositing particles having an average particle diameter smaller than that of the particles in a surface layer portion of the partition walls on the exhaust gas inflow side, the partition walls have an average pore diameter of 5 to 40 μm and a porosity of 35 to 75%, the particles deposited have an average particle diameter of 1 to 15 μm, and the composite region has a height of 80 μm or less with respect to the partition wall surface direction from the outermost contour line of the partition walls.

According to a second aspect, the honeycomb filter according to the first aspect is provided, wherein the particles having an average particle diameter smaller than the average size of the open pores formed by the particles constituting the partition walls and/or gaps between the particles are deposited to form the composite region.

According to a third aspect, the honeycomb filter according to the first or second aspects is provided, wherein the composite region is formed in the open pores and/or the gaps between the particles in the range from a surface layer reference line of the partition wall on the exhaust gas inflow side to a position of 30% of the partition wall thickness.

According to a fourth aspect, the honeycomb filter according to any of the first to third aspects is provided, wherein the composite region is formed in the open pores and/or the gaps between the particles in the range from a surface layer reference line of the partition wall on the exhaust gas inflow side to a position of the depth of at most 4 times the average pore diameter of the partition walls.

According to a fifth aspect, the honeycomb filter according to any of the first to fourth aspects is provided, wherein the particles deposited in the open pores and/or the gaps between the particles are formed of the same material as that for the particles constituting the partition walls.

According to a sixth aspect, the honeycomb filter according to any of the first to fifth aspects is provided, wherein the particles constituting the partition walls are formed of silicon carbide or a composite material of silicon carbide and silicon.

According to a seventh aspect, the honeycomb filter according to any of the first to sixth aspects is provided, wherein the particles deposited in the open pores and/or the gaps between the particles are bonded by a bonding phase different from the framework particles constituting the partition walls.

According to an eighth aspect, the honeycomb filter according to any of the first to seventh aspects is provided, wherein the particles deposited in the open pores and/or the gaps between the particles are bonded by a silica phase.

According to a ninth aspect, the honeycomb filter according to any of the first to eighth aspects is provided, wherein a catalyst is loaded on a part of or the entire portion of the partition walls and/or a part of or the entire portion of the composite region.

According a tenth aspect of the present invention, a method for producing a honeycomb filter is provided, the method comprising: forming a honeycomb formed body by subjecting a forming raw material containing a ceramic raw material to extrusion forming and forming plugging portions alternately in one side open end portions and the other side open end portions of the plural cells of the honeycomb formed body, firing the honeycomb formed body to form a honeycomb fired body, supplying particles having an average particle diameter smaller than that of the particles constituting the partition walls from the one side open end portions of the honeycomb fired body by a solid-gas two-phase flow, and at least in open pores formed by the particles constituting the partition walls and/or gaps between the particles, forming a composite region by depositing particles having an average particle diameter smaller than that of the particles in a surface layer portion of the partition walls on the exhaust gas inflow side; wherein the partition walls have an average pore diameter of 5 to 40 μm and a porosity of 35 to 75%, the particles deposited has an average particle diameter of 1 to 15 μm, and the composite region has a height of 80 μm or less with respect to the partition wall surface direction from the outermost contour line of the partition walls.

According to an eleventh aspect of the present invention, a method for producing a honeycomb filter is provided, the method comprising: forming a honeycomb formed body by subjecting a forming raw material containing a ceramic raw material to extrusion forming and forming plugging portions alternately in one side open end portions and the other side open end portions of the plural cells of the honeycomb formed body, firing the honeycomb formed body to form a honeycomb fired body, supplying particles having an average particle diameter smaller than that of the particles constituting the partition walls from the one side open end portions of the honeycomb fired body by a solid-gas two-phase flow, at least in open pores formed by the particles constituting the partition wall and/or gaps between the particles, forming a composite region by depositing particles having an average particle diameter smaller than that of the particles in a surface layer portion of the partition walls on the exhaust gas inflow side, and further performing a thermal treatment; wherein the partition walls have an average pore diameter of 5 to 40 μm and a porosity of 35 to 75%, the particles deposited has an average particle diameter of 1 to 15 μm, and the composite region has a height of 80 μm or less with respect to the partition wall surface direction from the outermost contour line of the partition walls.

According to a twelfth aspect of the present invention, a method for producing a honeycomb filter is provided, the method comprising: forming a honeycomb formed body by subjecting a forming raw material containing a ceramic raw material to extrusion forming and forming plugging portions alternately in one side open end portions and the other side open end portions of the plural cells of the honeycomb formed body, firing the honeycomb formed body to form a honeycomb fired body, loading a catalyst on the partition walls of the honeycomb fired body to obtain a catalyst-loaded honeycomb-structured body, supplying particles having an average particle diameter smaller than that of the particles constituting the partition walls from the one side open end portions of the honeycomb-structured body with the catalyst by a solid-gas two-phase flow, at least in open pores formed by the particles constituting the partition walls and/or gaps between the particles, forming a composite region by depositing particles having an average particle diameter smaller than that of the particles in a surface layer portion of the partition walls on the exhaust gas inflow side, and further performing a thermal treatment; wherein the partition walls have an average pore diameter of 5 to 40 μm and a porosity of 35 to 75%, the particles deposited has an average particle diameter of 1 to 15 μm, and the composite region has a height of 80 μm or less with respect to the partition wall surface direction from the outermost contour line of the partition walls.

According to a thirteenth aspect, the method for producing a honeycomb filter according to any of the tenth to twelfth aspects is provided, wherein the method comprises: supplying particles having an average particle diameter smaller than that of the particles constituting the partition walls from one side open end portion of the honeycomb fired body, and simultaneously, sucking the particles from the other open end portions of the honeycomb fired body to deposit the particles in the pores formed in the partition walls on the exhaust gas inflow side to form a composite region.

According to a honeycomb filter of the present invention, there is exhibited an excellent effect of being capable of providing a honeycomb filter capable of reducing pressure loss of the partition walls when exhaust gas passes through the partition walls with obtaining the same effect as in the layer formed on the partition walls by forming, at least in open pores formed by the particles constituting the partition walls and/or gaps between the particles, a composite region by depositing particles having an average particle diameter smaller than that of the aforementioned particles in a surface layer portion of the partition walls on the exhaust gas inflow side, allowing the partition walls to have an average pore diameter of 5 to 40 μm and a porosity of 35 to 75%, allowing the particles deposited to have an average particle diameter of 1 to 15 μm, and allowing the composite region to have a height of 80 μm or less with respect to the partition wall surface direction from the outermost contour line of the partition walls; and a method for producing the honeycomb filter. In addition, there is provided a honeycomb filter improving regeneration efficiency with improving purification performance, a honeycomb filter improving high trapping efficiency with reducing pressure loss due to the adhesion of soot, and a honeycomb filter reducing the pressure loss after ash deposition; and a method for producing a honeycomb filter.

DETAILED DESCRIPTION OF THE INVENTION

Figure 1:
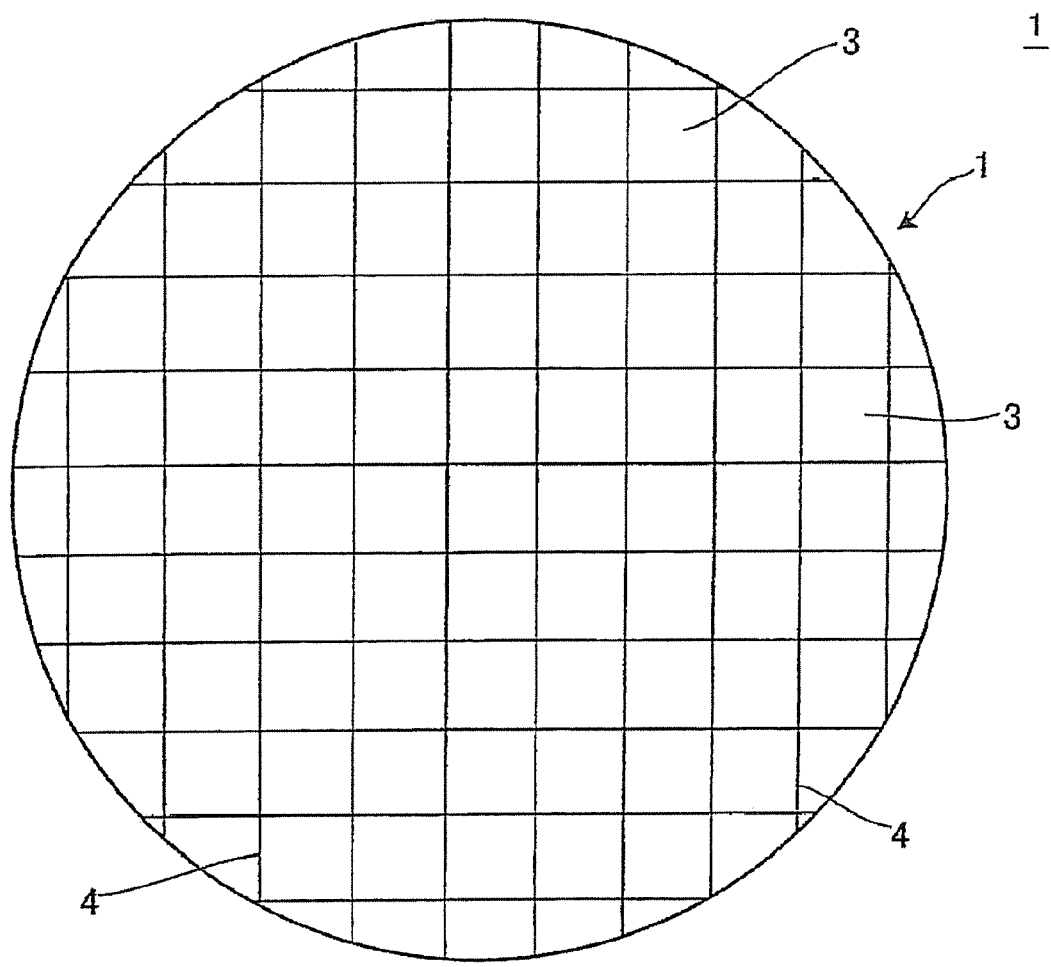
FIG. 1 is a schematic view showing a honeycomb filter to which an embodiment of the present invention is applied and plan view of the filter.

Hereinbelow, modes for carrying out a honeycomb filter of the present invention and a method for producing the honeycomb filter are specifically described. However, the present invention widely includes honeycomb filters and methods for producing the honeycomb filters provided with the subject matter of the present invention and is not limited to the following modes.

[1] Honeycomb Filter of the Present Invention:

As shown in FIGS. 1 to 4A, the honeycomb filter 1 of the present invention is constituted as a honeycomb filter 1 having a honeycomb-structured substrate provided with a plurality of cells 3 separated by partition walls 4 of porous ceramic having pores, wherein plugging portions 13 are formed alternately in one side open end portions 11a and the other side open end portions 11b of the plural cells 3, at least in open pores 7 formed by the particles constituting the partition walls 4 and/or gaps 9 between the particles, a composite region is formed by depositing particles 5 having an average particle diameter smaller than that of the particles in a surface layer portion 4a of the partition walls on the exhaust gas inflow side, the partition walls have an average pore diameter of 5 to 40 μm and a porosity of 35 to 75%, the particles deposited have an average particle diameter of 1 to 15 μm, and the composite region has a height of 80 μm or less with respect to the partition wall surface direction from the outermost contour line of the partition walls.

[1-1] Composite Region:

The composite region in the present embodiment is formed by depositing particles having an average particle diameter smaller than that of the aforementioned particles at least in open pores formed by the particles constituting the partition wall and/or gaps between the particles. That is, the composite region is constituted as a composite layer composed of the particles constituting the partition wall and the particles deposited on the partition wall by depositing particles having an average particle diameter smaller than that of the particles constituting the partition walls at least in open pores formed by the particles constituting the partition wall and/or gaps between the particles. The reason why the composite region is formed in the surface layer portion of the partition walls on the exhaust gas inflow side is because the pressure loss incidence rate is reduced to improve the PM trapping efficiency even without imparting properties of pores having small average pore diameter to the partition walls. In other words, even without forming a layer having small average pore diameter to the partition walls, by forming the composite region of the present embodiment, the pressure loss incidence rate of partition walls caused when the exhaust gas passes through the partition walls at high flow rates can be reduced with obtaining the same effect as in the formation of a layer having properties of pores having a small average pore diameter on the partition walls.

That is, by forming the composite region by depositing particles having an average particle diameter smaller than that of the particles constituting the partition walls in open pores and/or gaps between the particles, the particles as so-called "simulated ash" are deposited in the open pores and/or gaps between the particles. The particles (particles having an average particle diameter smaller than that of the particles constituting the partition walls) as the "simulated ash" inhibit soot and ash from entering the open pores and/or gaps between the particles. Therefore, the deposition of soot and ash can be controlled, and reduction of the pressure loss incidence rate in the partition walls can be realized.

Further, in the composite region, the particles having an average particle diameter smaller than that of the particles constituting the partition walls may be connected to one another in the open pores formed by the particles constituting the partition walls and/or gaps between the particles in the surface layer portion of the partition walls on the exhaust gas inflow side. The thus connected particles deposit in, for example, pores of the partition walls on the downstream side with respect to the surface layer of the particles constituting the partition walls and/or the region on the upstream side with respect to the surface layer of the particles constituting the partition walls. The particles connected to one another form an open pores of the partition walls and/or a space between the particles smaller than the size (pore size) of the space of the pores. Further, the particles connected to one another are present so as to cover a part of or the entire range of the particles constituting the partition walls and the gaps between the particles. The particles connected to one another also form the particle assemblage or particle layer described later.

Figure 5A:
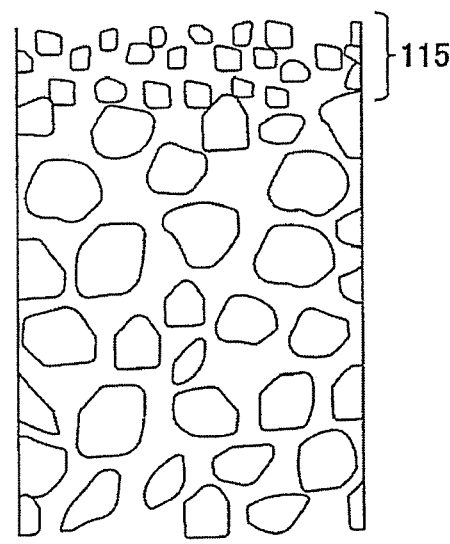
FIG. 5A is a partial cross-sectional view schematically showing a part of a partition wall of a conventional honeycomb filter.

For example, as shown in FIG. 5A, there is a conventional honeycomb filter (hereinbelow appropriately referred to as a "conventional honeycomb filter") composed of a two-layer structure having a layer having an average pore diameter smaller than that of the partition wall and formed on the partition walls as an inlet layer 115 and the partition wall. In comparison with the conventional honeycomb filter, the difference of the present embodiment is clear.

In the partition walls with which the conventional honeycomb filter is provided, specifically, there were a case (1) of generating pressure loss in the partition walls due to deposition of soot in the partition walls and a case (2) of generating pressure loss in the partition walls due to deposition of ash in the partition walls. Further, there was a case (3) of generating pressure loss by having both (1) and (2) together.

An example of the case (1) of generating pressure loss in the partition wall due to deposition of soot in the partition walls is as follows. In the first place, soot enters in the pores which are partition walls on the exhaust gas inlet side and formed in the surface layer portion of the partition walls. The soot having entered in the pores deposits in the pores to have a saturated state in the pores. Further, after the saturation in the pores, soot deposits on the partition walls to form a so-called cake layer. Thus, the pressure loss of the partition walls of (1) could be caused in the deposition mode where soot deposits.

Figure 5B:
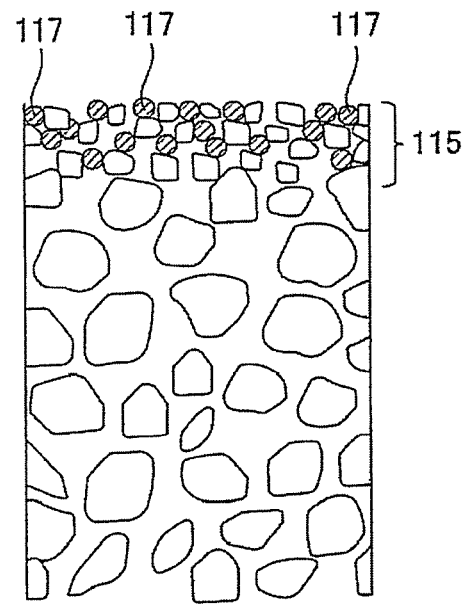
FIG. 5B is a partial cross-sectional view schematically showing a part of a partition wall of a conventional honeycomb filter.
Figure 5C:
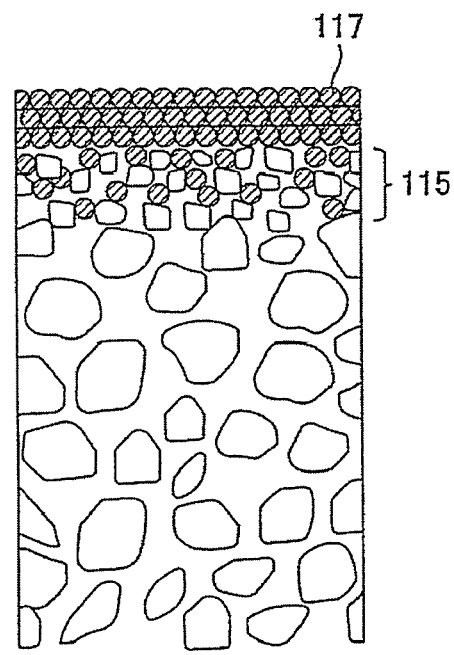
FIG. 5C is a partial cross-sectional view schematically showing a part of a partition wall of a conventional honeycomb filter.
Figure 5D:
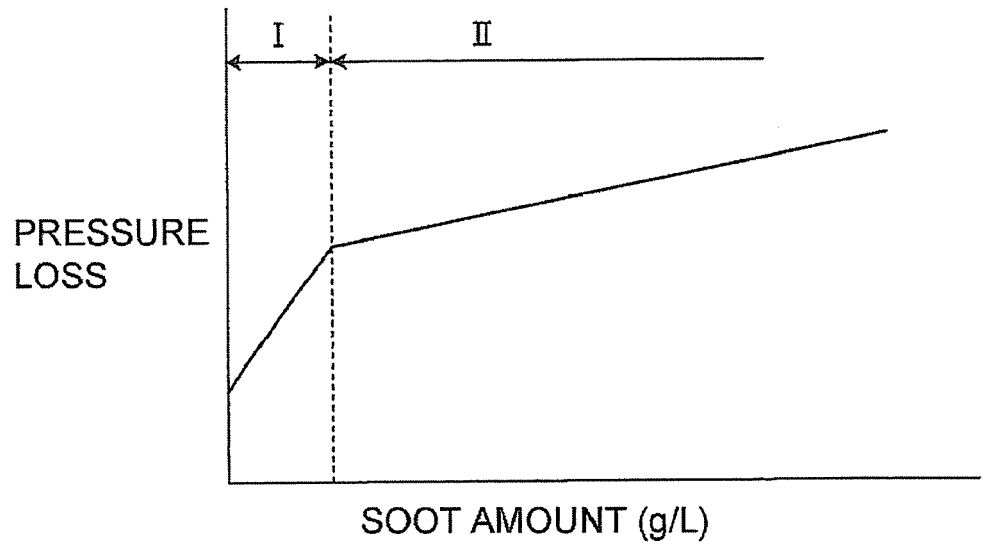
FIG. 5D is a graph showing the relation between the soot deposition amount and the pressure loss of the partition wall.
Figure 5E:
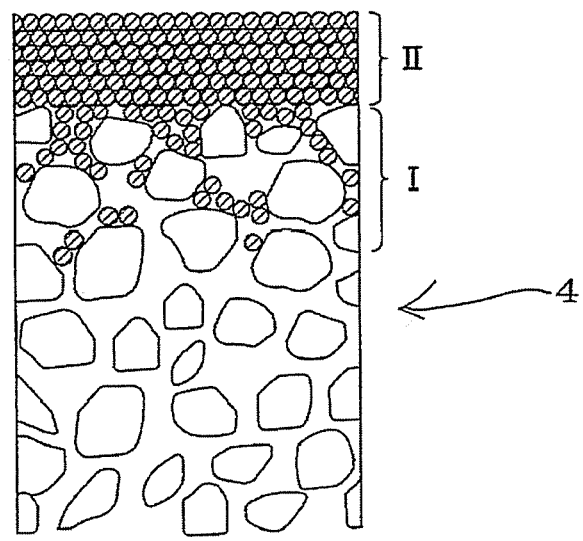
FIG. 5E is a partial cross-sectional view schematically showing a part of a partition wall of a conventional honeycomb filter.

Description will be given specifically with referring to drawings. As shown in FIG. 5B, in the initial stage where the engine is continuously driven a shot time, since the soot 117 does not sufficiently deposit on or in the partition walls, the soot enters the pores of the inlet layer 115. That is, as shown in FIG. 5B, the pressure loss of the partition walls attributed to the soot is caused by the stress applied to the partition walls when the soot 117 enters the pores to do damage to the partition walls. In other words, as shown in FIG. 5C, in the case that the soot 117 deposits sufficiently in the pores to have a saturated state or that the soot deposits sufficiently on the partition walls to form a cake layer, soot hardly enters or cannot enter. Therefore, pressure loss of the partition walls by the soot is hardly caused. This is clear also from FIGS. 5D and 5E showing the relation between the soot deposition amount and the pressure loss. In the initial stage of engine drive, as shown in FIG. 5D, the amount of soot entering the pores is high, and soot enters in the region of I shown in FIG. 5E to raise the possibility of causing pressure loss in the partition walls. However, when the pores have a saturated state after the soot enters in the pores, or when a cake layer is formed after the soot deposits on the partition walls, as shown in FIG. 5E, the state where the soot deposits in the region of II is shown. Therefore, as shown in FIG. 5D, the amount of soot entering the pores is reduced, thereby reducing the pressure loss incidence rate of the partition walls due to entry of the soot. Thus, there is a high possibility of causing the pressure loss of the partition walls by the soot in the initial stage where the engine is not continuously driven. On the other hand, in the stage where the engine is continuously driven, which is the stage next to the initial stage, there is a low possibility of causing the pressure loss of the partition walls. Therefore, the problem was how to eliminate the possibility of pressure loss of the partition walls repeatedly caused upon soot combustion in the regeneration control with trying to reduce pressure loss of the partition walls in the initial stage.

In addition, as an example of the case (2) of generating pressure loss in the partition wall due to deposition of ash in the partition walls, it could happen when ash enters in the pores which are partition walls on the exhaust gas inlet side and formed in the surface layer portion of the partition walls, or ash damages the surfaces of the partition walls in the state that the soot deposition on the partition walls is insufficient. Specifically, as shown in FIG. 5A, in the initial stage where the engine is not driven continuously, soot is not deposited on the partition walls or in the partition walls. That is, there is no so-called shielding layer which inhibits ash from entering the pores. Therefore, ash has various shapes and sizes and easily enters the pores in the state that no soot is deposited.

Further, ash is discharged from the engine with being mixed in the soot and flows into the passages (cells) of the honeycomb filter. Therefore, the deposition modes of soot and ash are simultaneously performed (3). The deposition modes of soot and ash have two prominent stages (Phase A and Phase B), and the pressure loss of the partition walls is caused from the composite factor.

Figure 6:
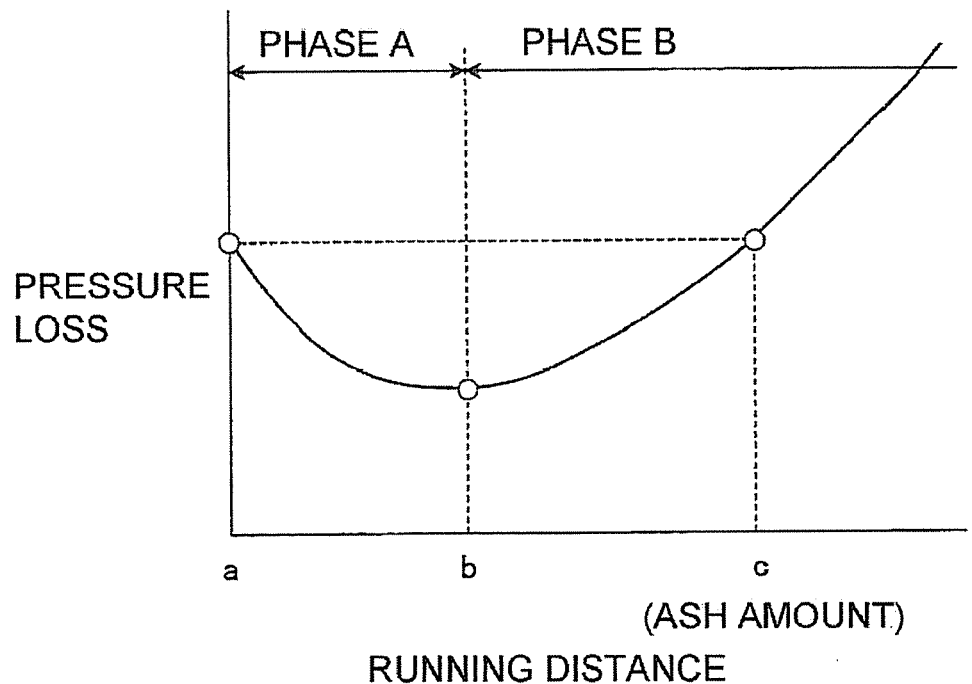
FIG. 6 is a graph showing the relation between the ash deposition amount and the pressure loss of the partition wall by soot.

In the first stage (Phase A, hereinbelow appropriately referred to as the "first state" or "phase A"), there is shown a general behavior showing that the pressure loss of the partition walls is caused by the deposition of ash. In this ash deposition pressure loss behavior is clear from the relation between the pressure loss of the partition walls attribute to the soot and the amount of ash shown in FIG. 6. That is, in the engine drive initial stage, since no soot is deposited in the surface layer portion of the partition walls on the exhaust gas inflow side, there is a high possibility of generating pressure loss of the partition walls because soot and ash are mixed and enter the pores to be deposited (see point a of FIG. 6).

Next, in the termination of the first stage (Phase A), soot is combusted by repeatedly regenerating a honeycomb filter. However, since ash is not combusted, ash gradually deposits in the pores. Thus, in the termination of the first stage (Phase A), ash deposited in the pores by the repeated regeneration of the honeycomb filter inhibits soot from entering the pores. As a result, the pressure loss of the partition walls is reduced (see point b of FIG. 6).

Further, when the regeneration of the honeycomb filter is repeated, ash contained in the soot is sent toward the downstream side of the cells (inlet cells) open at the inlet of the exhaust gas upon regeneration. Then, ash deposits on the plugging portions on the exhaust gas outlet side. Therefore, the effective volume of the inlet cells is gradually reduced. As a result, the thickness of the soot layer when a certain amount of soot deposits becomes large, and the partition wall permeation flow rate (flow rate when exhaust gas permeates the partition walls) becomes high, thereby raising the pressure loss of the honeycomb filter (DPF). This corresponds to the second stage (Phase B, hereinbelow appropriately referred to as the "second stage" or "phase B") (see Phase B of FIG. 6). Incidentally, "cell effective volume" means the capacity of the space where exhaust gas can pass and/or the space in the inlet cells where the soot can deposit. The smaller cell effective volume has a higher tendency of rise in exhaust gas permeation flow rate and a higher tendency of increase in thickness of the soot layer formed on the partition walls upon soot deposition. Therefore, the pressure loss incidence rate of the partition walls in the honeycomb filter (DPF) rises. Here, the exhaust gas permeation flow rate means the speed when exhaust gas permeates the partition walls, that is, the speed when the exhaust gas passes through the pores of the partition walls.

Figure 7:
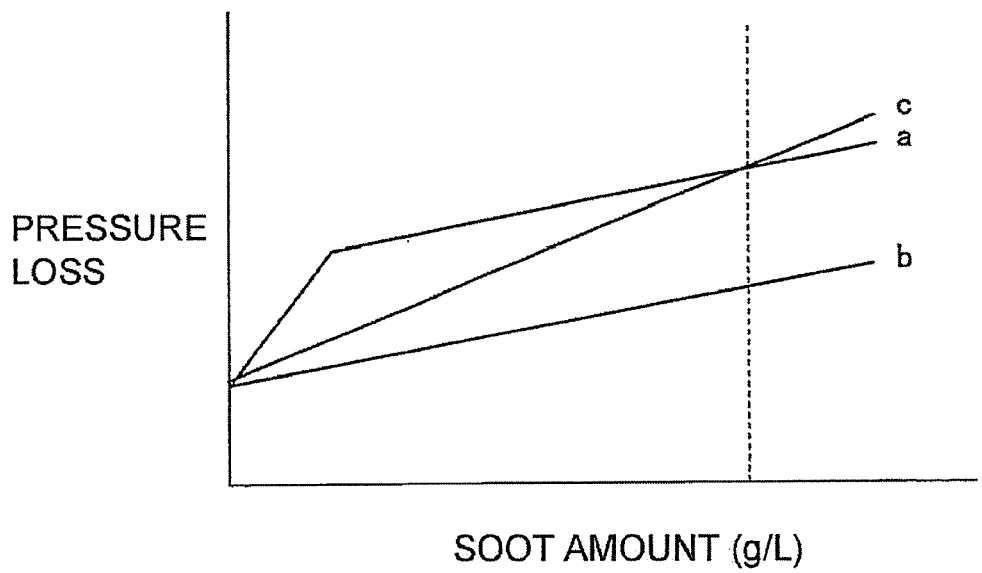
FIG. 7 is a graph showing the relation between the soot deposition amount in each step in engine drive and the pressure loss of the partition wall by soot.
Figure 8A:
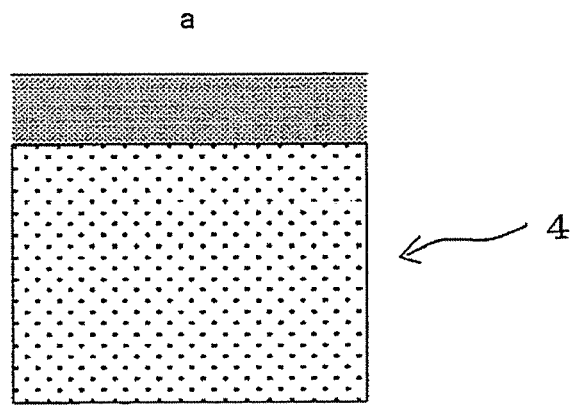
FIG. 8A is a partial cross-sectional view of a partition wall of a conventional honeycomb filter and view schematically showing a soot deposition condition of a partition wall in the initial stage in engine drive.
Figure 8B:
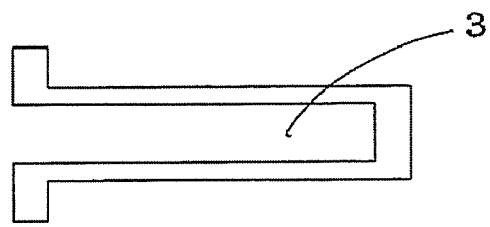
FIG. 8B is a partial cross-sectional view of a part of a cell of a conventional honeycomb filter, schematically showing the soot deposition condition in FIG. 8A in the cell longitudinal direction.
Figure 10A:
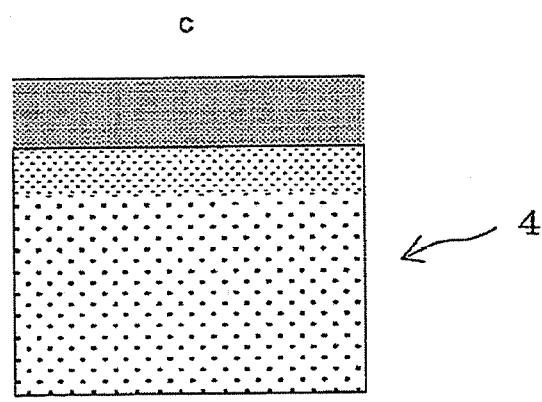
FIG. 10A is a partial cross-sectional view of a partition wall of a conventional honeycomb filter, schematically showing a soot deposition state of the partition wall after repeated regeneration.
Figure 10B:
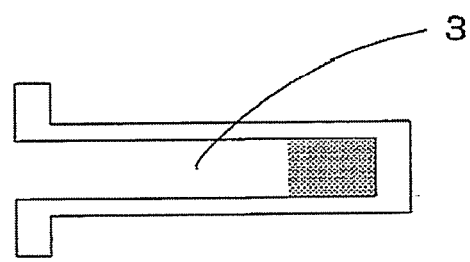
FIG. 10B is a view schematically showing the soot deposition state of FIG. 10A in the cell longitudinal direction.

In such two stages (Phase A and Phase B), the pressure loss incidence rate of the partition walls is hardly reduced, or the regeneration efficiency is hardly improved. For example, as shown in FIG. 7 showing the relation between the soot deposition amount and the pressure loss of the partition walls by soot deposition, in the initial stage where no ash is deposited of the graph a, as shown in FIGS. 8A and 8B, since no ash deposits in the pores of the partition walls, the cell effective volume is sufficient. However, the pressure loss incidence rate of the partition walls by soot cannot be reduced sufficiently, which is not preferable. On the other hand, as shown in the graph c of FIG. 7, in a state where sufficient ash is deposited (state where the regeneration treatment is performed repeatedly), the pressure loss incidence rate of the partition walls by soot can be reduced. However, the cell effective volume is not sufficient, and soot is sent toward the downstream side as shown in FIGS. 10A and 10B, which is not preferable.

Figure 9A:
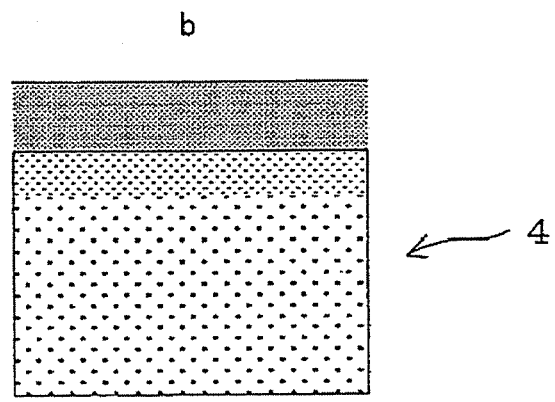
FIG. 9A is a partial cross-sectional view of a partition wall of a conventional honeycomb filter, schematically showing a soot deposition state of the partition wall in the initial stage in engine drive.
Figure 9B:
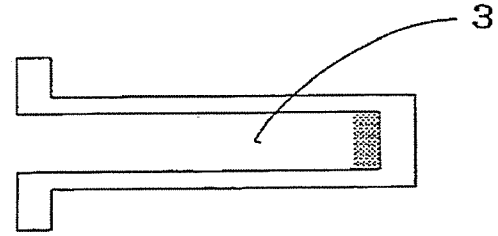
FIG. 9B is a view schematically showing the soot deposition state in FIG. 9A in the cell longitudinal direction.

Therefore, the present embodiment employs not only the two-layer structure where a layer of particles having an average particle diameter smaller than that of the particles constituting the partition walls is formed on the partition walls, but also the aforementioned structure. For example, the present embodiment employs a structure where the state of sufficient ash deposition of the graph b of FIG. 7 is added in advance. By such constitution, the effect of improvement in the soot combustion and regeneration efficiency is realized by securing the cell effective volume with reducing the pressure loss incidence rate of the partition walls as shown in FIGS. 9A and 9B. Above all, the regeneration efficiency is improved with reducing the pressure loss incidence rate of the partition walls regardless of the period of use of the engine.

Figure 4A:
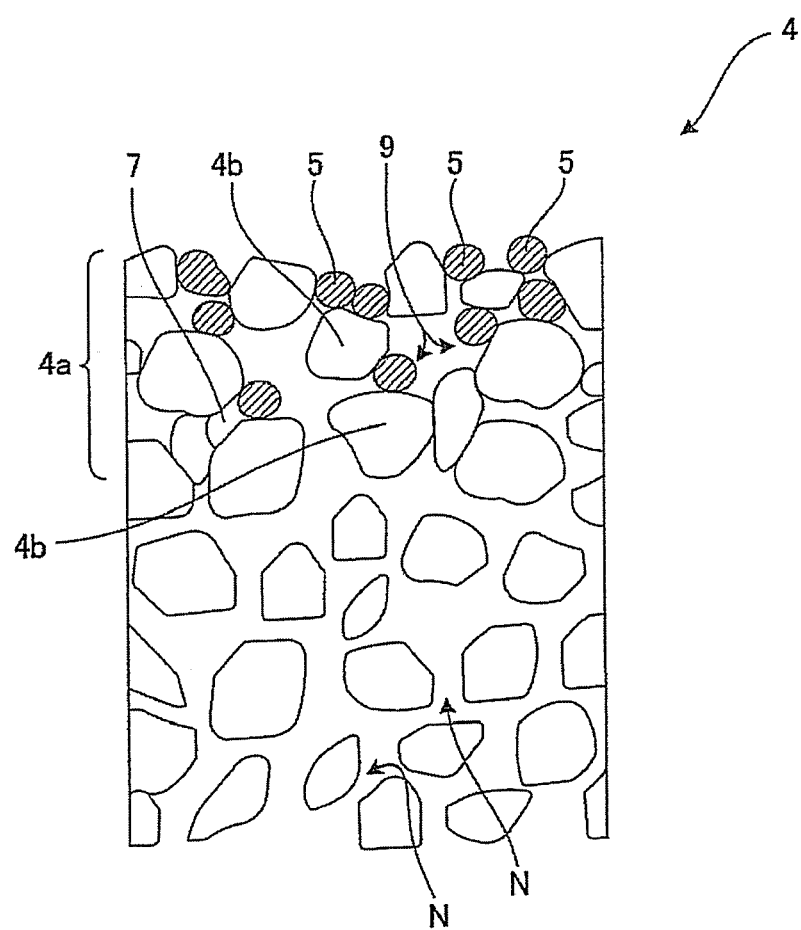
FIG. 4A is a partial cross-sectional view schematically showing a part of a partition wall of the honeycomb filter in the present embodiment.
Figure 4B:
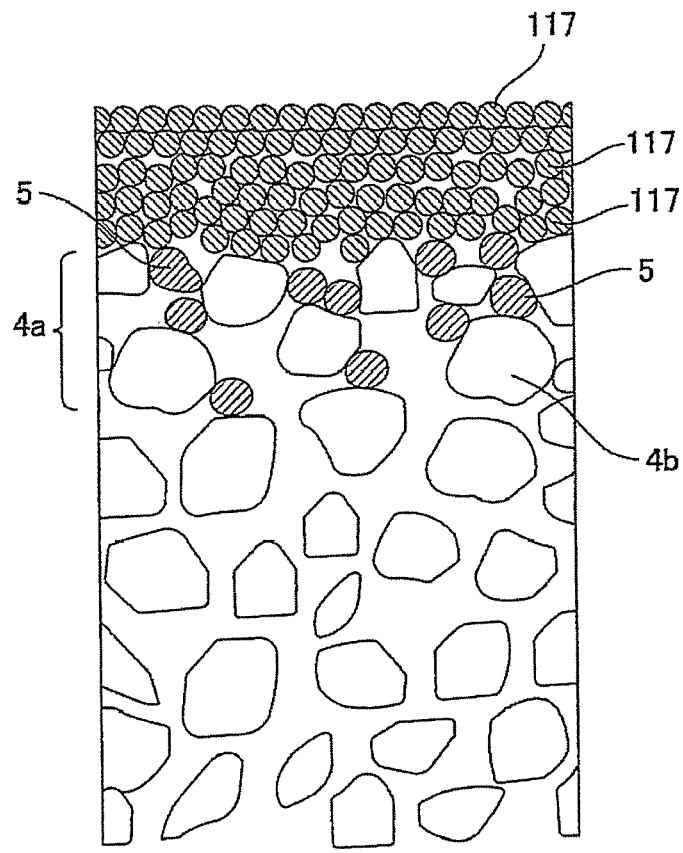
FIG. 4B is a partial cross-sectional view schematically showing a part of a partition wall of the honeycomb filter in the present embodiment.

In other words, in the present embodiment, as shown in FIG. 4A, by forming the composite region 4a by depositing the particles 5 having an average particle diameter smaller than that of the particles 4b constituting the partition walls 4 at least in the open pores 7 formed by the particles constituting the partition walls 4 and/or gaps 9 between the particles in a surface layer portion 4a of the partition walls on the exhaust gas inflow side, soot and ash are inhibited from entering the open pores and/or gaps between the particles as shown in FIG. 4B.

Figure 3:
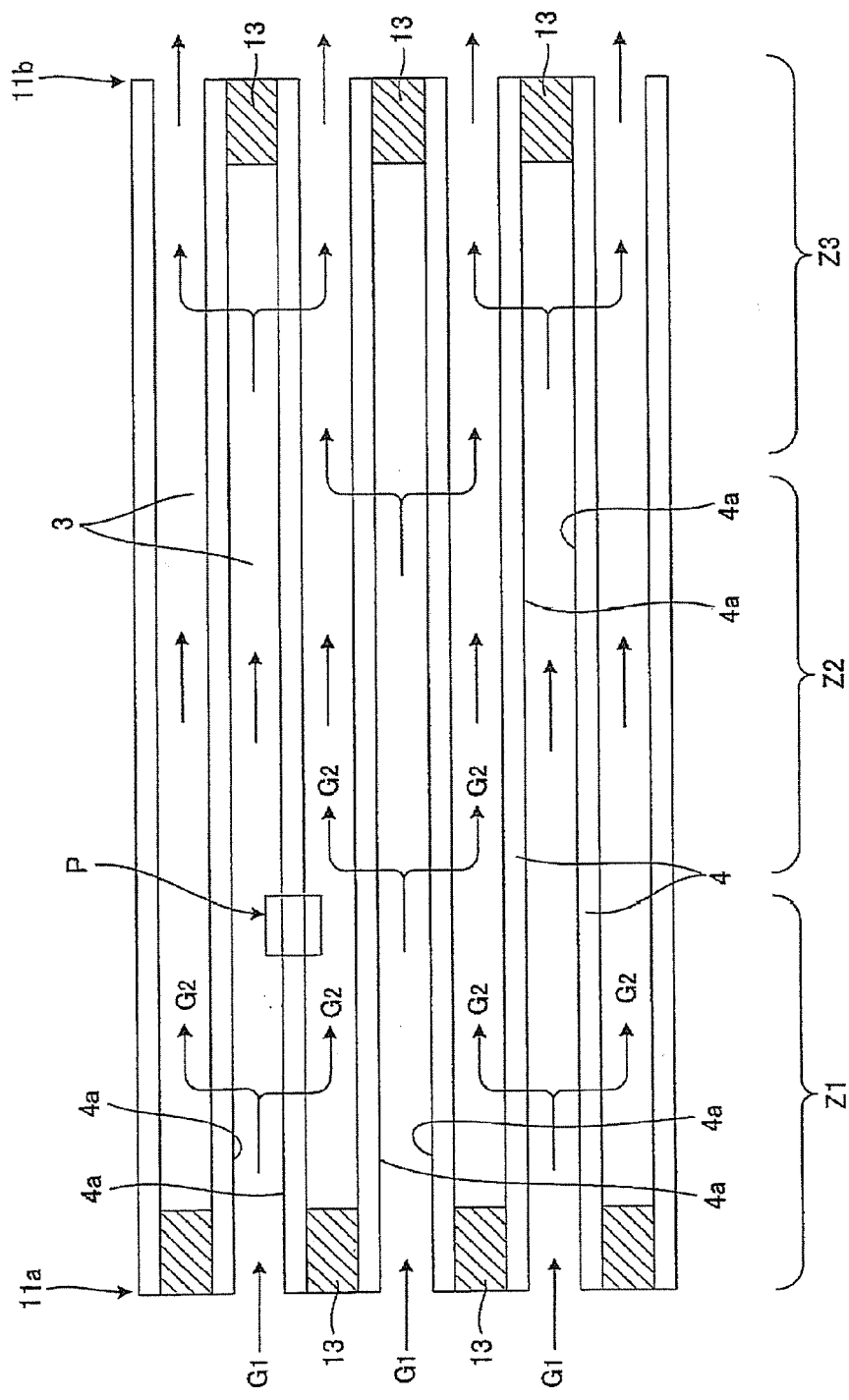
FIG. 3 is a cross-sectional view of the honeycomb filter of FIG. 1 and view shown schematically.

Here, the aforementioned "partition walls on the exhaust gas inflow side" means the partition walls formed on the exhaust gas inflow side in the honeycomb-structured substrate. Specifically, as shown in FIGS. 3 to 5, the partition walls on the exhaust gas inflow side correspond with the inlet ports of the exhaust gas inflow passages in the partition walls 4 which the cells 3 have and the region in the vicinity of the inlet ports.

In addition, the "surface layer portion" of the partition walls on the exhaust gas inflow side means the region on the exhaust gas inflow side in the region in the partition wall thickness direction and the region in the vicinity of the region. Specifically, as the region 4a shown in FIG. 4A, the region is the region on the exhaust gas inflow side in the region in the partition wall thickness direction on the exhaust gas inflow side and the region in the vicinity of the region.

In addition, the "particles constituting the partition walls" means, for example, ceramic particles.

In addition, the "open pores" formed by particles constituting the partition walls means the pores which the exhaust gas can enter without being closed among the pores formed by the particles such as the aforementioned ceramic particles. In other words, the "closed pores" which the exhaust gas cannot enter with being closed are excluded even if the pores are formed by the aforementioned particles. An example is an open pore which exhaust gas can flow in and flow out without being closed if particles do not deposit as the pore shown by the reference numeral 7 in FIG. 4A.

In addition, the "gap between particles" formed by the particles constituting the partition walls means the gaps formed between the particles formed by the particles such as the aforementioned ceramic particles and gaps exhaust gas can enter without being closed and formed between the particles. In other words, the gap which exhaust gas cannot enter with being closed are excluded even if the gap is formed between the aforementioned particles. An example is a gap formed between the particles (R1, R2) if particles are not deposited as the region shown by the reference numeral 9 of FIG. 4A.

Incidentally, the reason of specifying the matter to the open pores "and/or" gaps between the particles is because the pressure loss of the partition walls can be reduced even by depositing the particles in either the open pores or the gaps between the particles as the composite region though it is desirable that the composite region is formed in both the open pores and the gaps between the particles. However, it is more preferable that particles are deposited in both the open pores and the gaps between the particles as the composite region.

In addition, the reason why the particles having an average particle diameter smaller than that of the particles constituting the partition walls are deposited at least in the open pores formed by the particles constituting the partition walls and/or the gaps in the surface layer portion of the partition walls on the exhaust gas inflow side is because, even if deposition of the particles having an average particle diameter larger than that of the particles (e.g., ceramic particles) constituting the partition walls is tried, the particles hardly deposit in the open pores and/or gaps between the particles and hardly stay in the gaps. Further, the open pores and the gaps between the ceramic particles cannot be clogged sufficiently. As a result, it becomes hard to sufficiently trap soot in the composite region. In addition, soot passes through the composite region to easily deposit in the pores of the partition walls formed on the downstream side of the composite region. Therefore, soot deposition similar to the case of the conventional partition wall having two-layered structure is caused, and there is a high possibility of causing pressure loss in the partition walls. Thus, the particles to be deposited hardly play a role as the aforementioned "simulated ash".

On the other hand, when the average particle diameter of the particles to be deposited is smaller than the average particle diameter of the particles constituting the partition walls, adhesion to the aforementioned open pores and/or gaps between the particles becomes easy. However, when the average particle diameter of the particles to be deposited is too small, the particles having the small average particle diameter pass through the open pores and/or gaps between the particles in the surface layer portion of the partition walls on the exhaust gas inflow side. In addition, the particles may deposit inside the partition walls other than the aforementioned open pores and/or gaps between the particles. Therefore, in the inside of the partition walls, the connection portion of the pores of the partition walls is locally clogged, and the gas permeability at the time when exhaust gas permeates the partition walls is prone to be deteriorated. By the low gas permeability, the pressure loss incidence rate in the partition walls is raised to a great extent, which is not preferable. Therefore, it is desirable to form the composite region by adjusting the particles to be deposited to have an appropriate size (average particle diameter).

Here, "connection portion" of the pores of the partition walls means a portion where the distance between the particles is the smallest and where the inner diameter of the pore is the smallest in the case of forming gaps (spaces), i.e., pores between the particles by connecting the particles as SiC. In other words, it means a portion where the diameter of the exhaust gas passage is the smallest.

Incidentally, since the size of soot is generally about 100 nm on an average, and the size of ash is about 1 μm on an average, it is preferable that the particles to be deposited have appropriate sizes which soot these sizes.

In addition, the "particles having an average particle diameter smaller than the average particle diameter of the particles" means the particles to be deposited in the open pores and/or gaps between the particles has an average particle diameter smaller than the average particle diameters of the particles constituting the partition walls. Each of the diameters of the particles constituting the partition walls and the diameters of the particles constituting the composite region can be calculated by the image analysis from the photograph of a polished face or a fracture face of a SEM. Incidentally, the contribution to the reduction of pressure loss with soot (partition wall pressure loss caused by the deposition of soot in pores) basically depends on the absolute value of the particle diameter of particles forming the composite region and the deposition state and deposition distribution in the composite region of particles having an average particle diameter smaller than that of particles. Therefore, it is not determined only by the ratio of the average particle diameter of the particles having an average particle diameter smaller than that of the particles constituting the composite region to the average particle diameter constituting the partition walls. That is, even if particles constituting the same composite region are used, in the case that the average pore diameter of the partition walls is very large, or in the case that the porosity of the partition walls is very high, the particles (deposited particles) having an average particle diameter smaller than the average particle diameter of the particles constituting the partition walls do not stay in the composite region, and many particles enter the pores of the partition walls other than the composite region to easily clog pores. Therefore, there may be caused a defect such as remarkable rise of the pressure loss incidence rate of the partition walls. Accordingly, it is preferable to deposit desired "particles having an average particle diameter smaller than that of the particles" according to the absolute value of the diameter of the particles forming the composite region, the deposition condition, and the deposition distribution.

Further, it is preferable to form the aforementioned composite region by depositing the particles having an average pore diameter smaller than the average size of the open pores formed by particles constituting the partition walls and/or the gaps between the particles. By depositing the particles having an average pore diameter smaller than the average size of the open pores formed by particles constituting the partition walls and/or the "gaps" between the particles, the composite region can be densified in comparison with the partition walls, which is preferable. Further, necessary and sufficient particles can be filled more efficiently in the open pores and/or gaps between the particles, soot can efficiently be inhibited from entering the pores of the partition walls.

[1-1-1] Particles to be Deposited (Simulated Ash):

The composite region of the present embodiment is formed by depositing particles having an average particle diameter smaller than that of the particles at least in the open pores formed by the particles constituting the partition walls and/or gaps between the particles. That is, "particles to be deposited" constitute a part of the composite region and are deposited on the partition walls as "simulated ash" as described above (hereinbelow, the "particles to be deposited" are appropriately referred to as "simulated ash"). By depositing particles as simulated ash, soot and ash can be inhibited from entering the open pores and/or the gaps between the particles in the composite region even in the engine initial rotational state where the soot and ash do not deposit on the partition walls or in the pores of the partition walls. Therefore, pressure loss of the partition walls can be inhibited from being caused.

In addition, the soot inhibited from entering the open pores and/or the gaps between the particles by the particles as the simulated ash is combusted upon regeneration. Therefore, since soot does not deposit even by the repeated regeneration, the effective area of the honeycomb filter is not reduced. Further, no influence is received from the engine drive time or the deposition mode of soot and ash. In other words, regardless of the engine start-up time or the continuous drive time, the pressure loss incidence rate of the partition wall can be reduced. In addition, since soot can be inhibited from entering the pores of the partition walls, ash contained in the soot, particularly, sulfur component contained in the ash can be inhibited from contacting the catalyst even in the case that a catalyst is loaded in the pores of the partition walls. Therefore, the catalyst can be inhibited from deteriorating.

In addition, the average pore diameter of the particles deposited in the open pores and/or the gaps between the particles is 1 to 15 μm. The average pore diameter of the particles deposited is preferably 1 to 5 μm. When it is smaller than 1 μm, since the packing density in the pores of the partition walls becomes high to fill the pores, the pressure loss incidence rate of the partition walls is raised. When it is larger than 15 μm, since the space region between the particles forming the pores cannot be clogged efficiently, PM easily passes through the space region between the particles forming the partition walls and the composite region-forming particles. Therefore, sufficient trapping efficiency cannot be obtained. Incidentally, the average diameter of such particles can be measured by an image analysis with observing the resin-embedded polished surface or a fracture face by a SEM.

The height of the composite region is 80 μm or less with respect to the partition wall surface direction from the outermost contour line of the partition walls. This enables the particles to easily stay in the open pores and/or the gaps between the particles. In other words, the deposited particle hardly flows toward the adjacent cell side (so to speak, exhaust gas outlet side) on the downstream side of the composite region from the open pores and/or the gaps between the particles when the exhaust gas flows into the partition walls and flows out from the partition walls. Further, the hydraulic diameter of the cell inlet (unplugged cell serving as an inlet for exhaust gas) can be secured sufficiently. Above all, pressure loss of the partition walls in the region (high flow rate region) where exhaust gas passes at high flow rates can be inhibited. On the other hand, when it is larger than 80 μm, the hydraulic diameter of the cell inlet becomes small to raise the pressure loss incidence rate of the partition walls particularly in the high flow rate region, which is not preferable. It is more preferably 30 μm or less.

Incidentally, the aforementioned composite region may be constituted of a particle assemblage where the particles to be deposited form an assemblage, or, a particle layer where particle assemblages are connected to one another to form a layer. In the particle assemblages, for example, an assemblage of particles where the particles to be deposited are formed of plural particles or an assemblage where particles are connected to one another is included. On the other hand, by a thermal treatment, that is, addition of pore former and the like upon subjecting the material to reaction sintering, the pore structure formed is eliminated. In other words, it means the state where the pore structure formed by connecting the spaces (pores) formed by the pore former is eliminated to allow the assemblages of particles to be dispersed (sprinkled) as an assemblage in the open pores and/or the gaps between the particles. Examples of the formation of the particle assemblages are the formation by mixing silica or the like in ceramic particles or the like and the formation by depositing only simple ceramic particles on the partition walls. However, the formation is not limited to these.

In addition, the "outermost contour line of the partition wall" means a supposition line (virtual line) for separating a partition wall and a cell and contour line located on the outermost side among the lines forming the contour line of the partition wall. That is, the "outermost contour line of the partition wall" means the outermost contour line of the partition wall and supposition outermost contour line formed upon connecting the points where a particle forming the outer contour line is separated from the projection line. Further, when the pores are formed with particles separating from one another, the virtual line obtained by drawing a line parallel to the surface layer reference line described later from a point separated from the projection line on the surface of each particle corresponds to the "outermost contour line". Specifically, each of the particles forming the outermost contour line of the partition walls is present in the partition wall which is the nearest to the boundary separating the passage (cell) where a fluid flows from the partition wall, and the suppositional contour line obtained by connecting the particles serves as the "outermost contour line". In the case that the particles each forming the outermost contour line of the partition are not adjacent to each other to form a pore, the supposition line formed by drawing a line parallel to the surface layer reference line to connect the points where each of the partition walls separated from each other separates from the projection line serves as the "outermost contour line". Further, though the partition wall appears to be formed into an almost flat and smooth plate shape by eye observation, it can be confirmed that numerous irregularities are formed on the contour of the partition walls. It is preferable to deposit the particles, particle assemblages, and particle layer in the region from the supposition line obtained by connecting, parallel to the surface layer reference line, the points where the aforementioned particles in the region along the concave or convex contour of the partition walls having numerous irregularities separate from the projection line in the pores to at least the surface of the partition wall.

In addition, the "surface layer reference line" shows the average height of the irregularities of the surface layer in one visual field.

Therefore, "the composite region has a height of 80 μm or less with respect to the partition wall surface direction from the outermost contour line of the partition walls" means that, in the case that the particles to be deposited in the open pores and/or the gaps between the particles form the aforementioned composite region, the particles are present in the region (open pores and/or the gap between the particles) within 80 μm in the partition wall thickness direction (direction perpendicular to the partition wall) from the outermost contour line of the partition wall toward the partition wall surface. Incidentally, in the case that the particles to be deposited in the open pores and/or the gaps between the particles form the aforementioned composite region as particle assemblages of assemblages, it means that the particle assemblages are present in the region within 80 μm in the partition wall thickness direction (direction perpendicular to the partition wall) from the outermost contour line of the partition wall toward the partition wall surface. In addition, the same can be applied to the particle layer. In addition, the same can be applied to the case where the particles, particle assemblages, and particle layers are present together to form the composite region. Further, the "height of the composite region" means the distance from the point where the particle forming the composite region is farthest in the partition wall thickness direction (direction perpendicular to the partition wall) (point where the particle forming the outermost contour line is farthest from the projection line) with the outermost contour line of the partition wall as the base to the outermost contour line.

As a specific measurement method of the "height of the composite region", a resin-embedded polished cross section or a fracture surface is observed by a SEM, and an image analysis is performed for the measurement. In the image analysis, the outermost contour line of the partition wall is drawn, and then a line parallel to the outermost contour line in the partition wall thickness direction (direction perpendicular to the partition wall) is drawn. Then, the line parallel to the outermost contour line is gradually raised toward the upstream side (partition wall perpendicular direction side) for observation. In the observation visual field, the point where the particle assemblage separates from the line parallel to the outermost contour line is obtained for the measurement with the distance from the outermost contour line of the partition wall as the composite region height.

Figure 11:
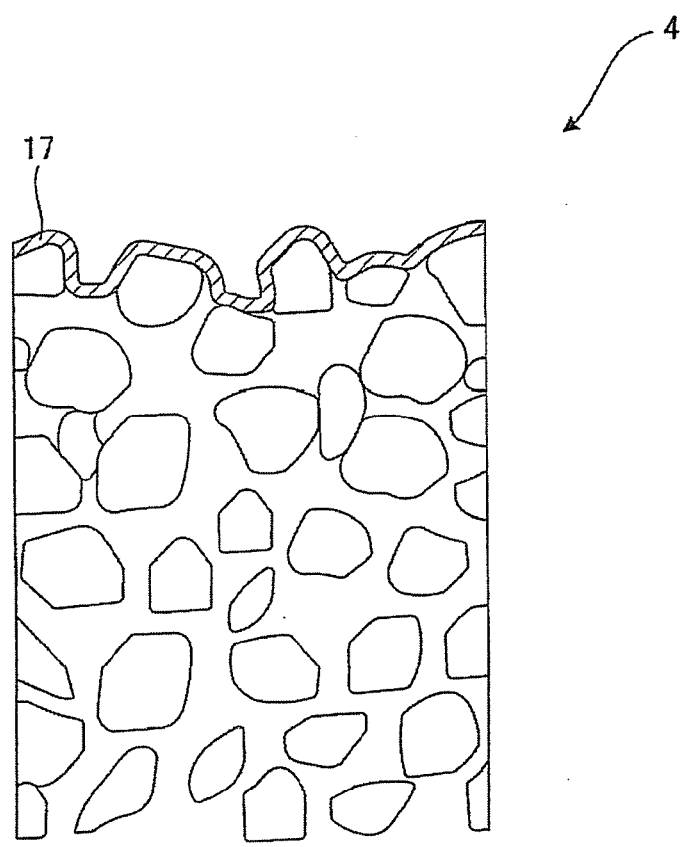
FIG. 11 is a partial cross-sectional view of a partition wall of the honeycomb filter of the present embodiment, schematically showing the outermost contour line.
Figure 12:
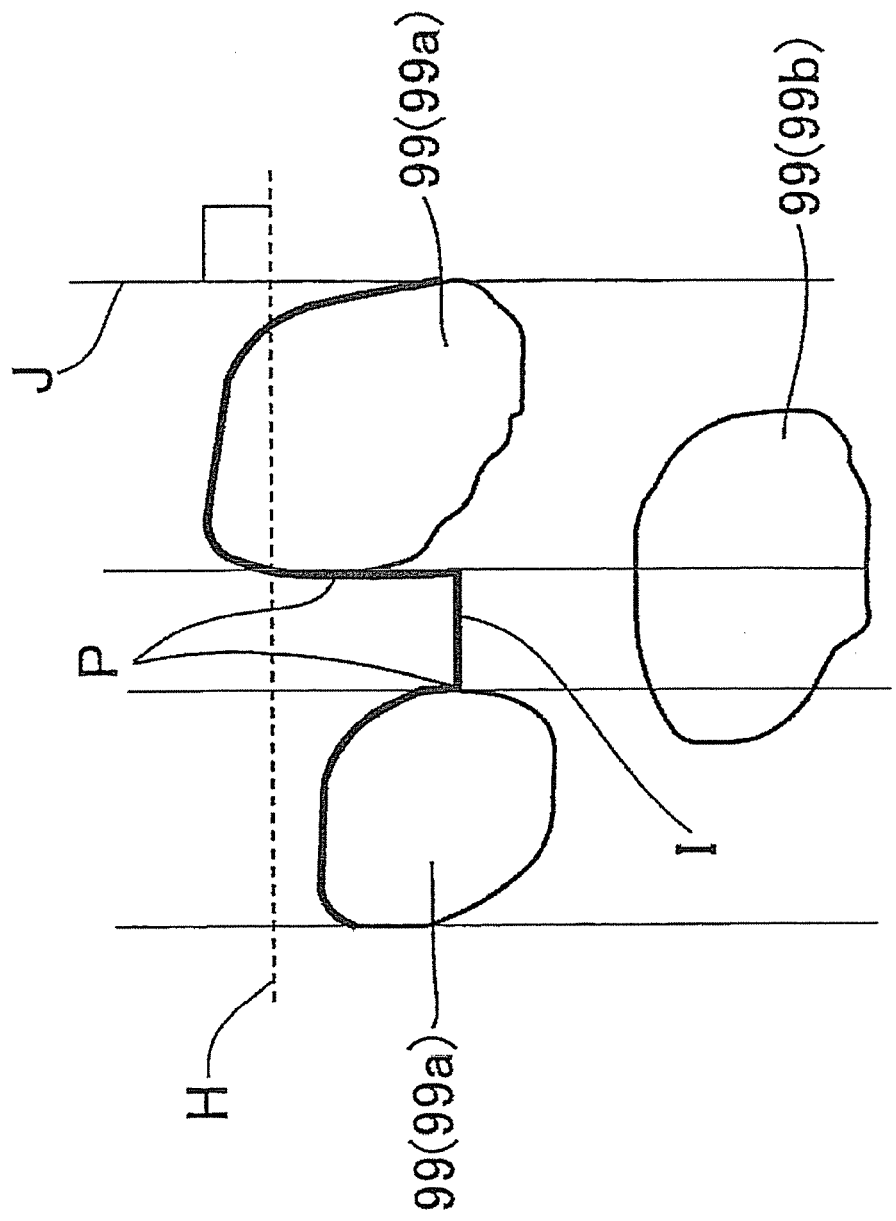
FIG. 12 is a partial cross-sectional view of a partition wall of the honeycomb filter of the present embodiment, schematically showing the outermost contour line.

Specifically, the outermost contour line 17 having irregularity can be shown in FIG. 11. At least particles are deposited in the region of 80 μm or less from the outermost contour line in the partition wall surface direction. More specifically, as shown in FIG. 12, the outermost contour means the contour obtained when the particles 99a forming the outermost contour of the partition wall is connected to the point P where the projection line is separated. Further, in the case that particles are separated from each other to form a pore, the supposition line obtained by drawing the parallel line I parallel to the surface layer reference line H from the point P where the particle surface separates from the projection line and further drawing a perpendicular line from the point P to connect with the aforementioned parallel line I is referred to as the outermost contour line. Incidentally, the reference symbol J shown in the figure shows a projection line to the surface layer reference line.

Incidentally, though the outermost contour line shown in FIG. 11 is drawn as a supposition line like a belt, it is for the convenience of description, and, needless to say, such a supposition line is not shown in the honeycomb filter of the present embodiment.

In the case, regarding the surface layer reference line, the "composite region depth" and "composite region depth rate" in the present specification mean the following content, respectively.

The "composite region depth" means the depth of entry of the particles to be deposited from the aforementioned surface layer reference line toward the down stream side in the partition wall thickness direction in the partition wall surface layer having irregularity. The "composite region depth" can be measured by the following technique. In the first place, a sample obtained by subjecting the partition wall base material to resin-embedded polishing is prepared in advance, and the surface layer reference line is obtained by an image analysis or the like in a SEM observation. Next, from the surface layer reference line, the depth of the entry of the particles deposited on the downstream side of the partition wall is measured. Thus, the maximum entry depth in one visual field of the SEM is determined as the composite region depth in the measurement.

The "composite region depth rate" means the proportion of the aforementioned composite region depth with respect to the partition wall depth. Here, the "partition wall thickness" means the distance between the partition wall surface on the upstream side and the partition wall surface on the downstream side. More strictly speaking, it is shown by the distance between the surface layer reference lines on the upstream side and on the downstream side. For the measurement of the partition wall thickness, a sample obtained by subjecting the partition wall base material to resin-embedded polishing is prepared in advance in the same manner as in the measurement of the composite region depth. Further, by obtaining the surface layer reference lines on the upstream side and the downstream side in the SEM observation of the polished face of the sample, the "composite region depth rate" can be measured.

Incidentally, each of the measurements of the "composite region depth" and the "composite region depth rate" is performed as follows. As shown in FIG. 3, measurement is performed at three to five points in total in the central portion and outer peripheral portion in a cross section perpendicular to the axial direction with respect to the radial direction in the central portions of the upstream portion (exhaust gas inflow side Z1), mid-stream portion (mid-stream portion Z2 (mid-stream region Z2), and the down stream portion (exhaust gas outflow side Z3) with respect to the axial direction of the honeycomb filter. The average value of the measurement data at 9 to 15 points in total is determined as the measurement value of the honeycomb filter to be measured. The upstream potion, the mid-stream portion, and the downstream portion are trisected, and the measurement is performed in the central portion of each section. Regarding the radial direction, the region on the central side with respect to the center of the radius is determined as a central portion, and the region on the outside with respect to the center of the radius is determined as the outer peripheral portion in the radius of a cross section, and the measurement is performed at three to five points of each of the regions. Here, the aforementioned "radial direction" means the outside direction in a cross section perpendicular to the axial direction of the honeycomb filter and is not limited to the meaning of the words. This is because not only the case that the cross section perpendicular to the axial direction of the honeycomb filter is circular, but also the case that the cross section is oval and the case that the cross section is irregular are included.

In addition, it is preferable that the composite region is formed in the open pores and/or the gaps between the particles in the range from the surface layer reference line of a partition wall on the exhaust gas inflow side to 30% of the partition wall thickness. This is because, when the particles deposited is above 30% in the partition wall thickness direction, the deposited particles begin to clog the neck portions of the partition wall pores, and the possibility of causing pressure loss of the partition wall rises. That is, when the "neck portion" of a partition wall pore is clogged, exhaust gas cannot permeate the partition wall to make the flow of the exhaust gas into the adjacent cell though the partition wall difficult. This state raises the (inflow and outflow) pressure when exhaust gas passes through the partition wall (make the gas permeability low) and the stress applied to the partition wall increases. Therefore, the pressure loss of the partition wall is easily caused.

Here, the "[neck portion] of partition wall pore" means the region where the size of the pore is small in the distribution of pores in the partition wall and region where the inner diameter of the duct line is small. For example, the region is shown by the symbol N in FIG. 4A. In addition, "the deposited particles begin to clog the neck portions of the partition wall pores" means that the clogging of the neck portions is increased by the formation of the composite region to narrow the exhaust gas passage by the clogging. Thus, when "the deposited particles begin to clog the neck portions", the gas permeability falls to increase pressure loss.

Further, it is preferable that the composite region is formed in the open pores and/or the gaps between the particles from the surface layer reference line of the partition wall on the exhaust gas inflow side to the depth up to 4 times the average pore diameter of the partition wall. When it is larger than 4 times, the particles forming the composite region begin to clog a neck portion in the open pores and/or the gap between particles, and pressure loss rises. When the clogging in neck portions of partition wall pores increases, the pressure loss rises, which is not preferable.

Here, the "open pores and/or the gaps between the particles to the depth up to 4 times the average pore diameter of the partition wall" means the open pores and/or the gaps between particles formed in the region to the depth (partition wall thickness) of 4 times the average pore diameter of the partition wall or less in the partition wall thickness direction. For example, when the average pore diameter of the partition wall is 15 μm, they mean the open pores and/or the gaps between particles formed up to about 60 μm in the partition wall thickness direction.

In addition, it is preferable that the particles to be deposited in the open pores and/or the gaps between the particles are of the same material as that for the particles constituting the partition walls. In the case that the particles to be deposited in the open pores and/or the gaps between the particles are formed of the same material as that for the particles constituting the partition walls, not only the adjustment of durability and stress is easy, but also the formation is simple, which is preferable. Further, a unit price of the product can be reduced, which is preferable. Here, "formed of the same material as that for the particles constituting the partition walls" means that, for example, in the case that the partition walls are formed of silicon carbide or a composite material of silicon carbide and silicon, the particles formed of silicon carbide serving as the framework of the partition walls are deposited.

In addition, it is preferable that the particles constituting the partition walls are of silicon carbide or a composite material of silicon carbide and silicon. By the connection of particles constituting a partition wall, a pore of the partition wall is formed. Therefore, pores of the partition walls are formed by the connection of the particles constituting the partition walls. Therefore, no closed pore is substantially present in the partition walls, and most pores of the partition walls are communicated pores. Therefore, upon depositing the particles having an average particle diameter smaller than the average particle diameter of the particles constituted of the partition walls, the particles are easily deposited in the open pores of the particles and/or the gaps between the particles.

One of the preferable embodiments is that the particles deposited in the open pores and/or the gaps between the particles are connected with one another by a connection phase different from the framework particles constituting the partition walls. The embodiment is preferable because, in the case of the same connection material, there may infrequently be caused a negative effect of remarkable clogging of the pores by the connection of the connection phases upon being exposed at high temperature for a long period of time. Therefore, such a defect in the production process can be inhibited before it happens.

Further, it is preferable that particles deposited in the open pores and/or the gaps between particles are connected by a silica phase. In the composite region, since the contact of the particles deposited in the pores and/or the gaps of the partition walls with the soot entering therein increases, the temperature rise by the extraordinary local combustion of the soot upon regeneration tends to increase. However, by connecting the particles by the silica phase, the thermal resistance of the composite region is increased, and the reactivity resistance against ash or sulfur component can be improved. Therefore, the durability of the composite region becomes high, which is preferable. Specifically, in the case that the partition wall base material is of silicon carbide or a composite material of silicon carbide and silicon, by the thermal treatment in the ambient atmosphere or the like, the silica phase is formed on the surface of the particles of the particle assemblage constituted of the silicon carbide. Therefore, it is possible to connect the silicon carbide particles together, or the silicon carbide particles to the base material constituted of a silicon carbide or a composite material of silicon carbide and silicon. Thus, there can be formed the composite region adhering to the partition wall base material or particle assemblages depositing on and adhering to the partition walls described later are formed.

Incidentally, in the case of forming a silica phase, the ratio of the amount of silica to be used is preferably 0.5 to 5.0 mass % of the total amount of the partition walls and the particle assemblages deposited on the partition walls. Preferable strength or thermal conductivity of the partition walls can be obtained, and preferable adhesion strength of the particle assemblage to be deposited can be obtained. The thickness of the silica on the surfaces of the particles constituting the particle assemblage is preferably 0.1 to 5 μm. When it is smaller than 0.1 μm, since the bonding force between the particles is not sufficient, peeling of the particle assemblage may be caused. When it is larger than 0.5 μm, a crack may be caused between the particles by the thermal expansion at high temperature to cause peeling of the particle assemblage. Incidentally, "peeling of the particle assemblage" includes both the case that one particle and/or small particle assemblage is peeled by the peeling of a part of the bonding of the particles in the particle assemblage and the case that the peeling is caused at the interface between the particle assemblage and the partition wall by the peeling at the bonding point between the particle and the particle constituting the partition wall. In addition, the aforementioned "silica thickness" is measured by a SEM image after the confirmation of silica phase by the EDX analysis in the first place by the SEM observation of the resin-embedded polished surface. Incidentally, EDX stands for Energy Dispersive X-ray Spectroscopy.

Figure 2:
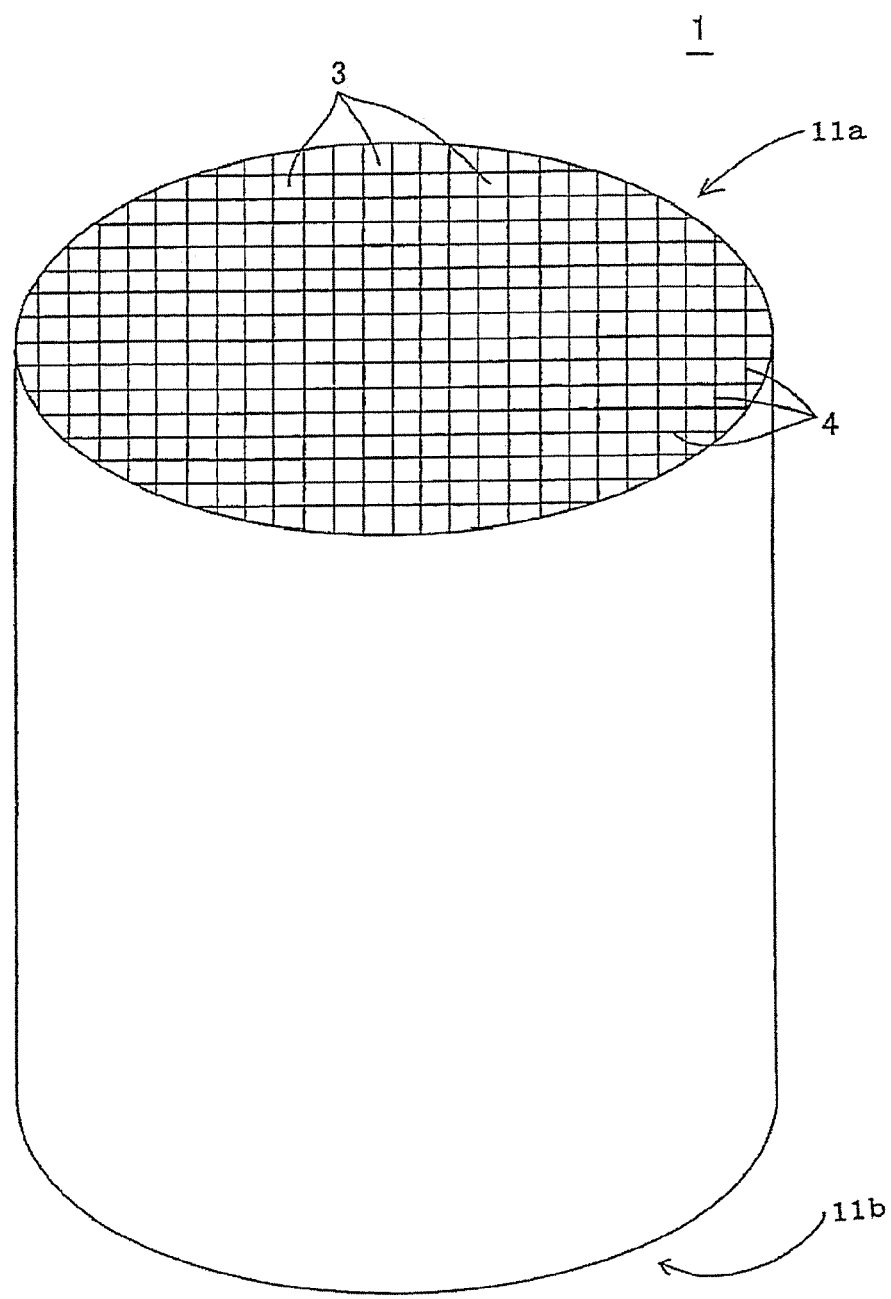
FIG. 2 is a schematic view showing the honeycomb filter of FIG. 1 and perspective view of the honeycomb filter.

[1-2] Honeycomb-Structured Body:

The honeycomb-structured substrate in the present embodiment is a honeycomb-structured base material provided with a plurality of cells separated by partition walls 4 of porous ceramic having numeral pores and functioning as exhaust gas passages as shown in FIGS. 1 to 3. The honeycomb-structured substrate is constituted as a honeycomb filter where the partition walls 4 of the cells 3 each have the upstream layer 13 on the exhaust gas upstream side and the downstream layer 15 on the downstream side. Incidentally, a catalyst may be loaded on the honeycomb filter as necessary to obtain a catalyst-loaded filter.

In addition, plugging portions may be formed to alternately plug the open end portions 11a on one side and the open end portions 11b on the other side of plural cells.

Incidentally, the entire shape of the honeycomb structure is not particularly limited and may be a quadrangular columnar shape, a triangular columnar shape, or the like as well as a circular cylindrical shape as shown in FIGS. 1 and 2.

In addition, examples of the shape of the cells (cell shape in a cross-section perpendicular to the cell formation direction) the honeycomb-structured substrate includes a square shown in FIG. 1, a hexagon, and a triangle. However, the shape is not limited to such a shape, and known cell shapes can widely be included. A more preferable cell shape is a circle or a polygon having four or more angles. The reason why a circle or a polygon having four or more angles is preferable is because the thickness of the catalyst layer can be made uniform by decreasing the thick catalyst in a corner portion in the cell cross section. Above all, in consideration of cell density, open ratio and the like, a hexagonal cell is suitable.

Though there is no particular limitation on the cell density the honeycomb-structured substrate is provided with, in the case of use as a catalyst-loaded filter of the present embodiment, it is preferably 0.9 to 233 cells/cm$^2$. In addition, the thickness of partition walls is preferably 20 to 2000 μm.

In addition, the porosity of the partition walls the honeycomb-structured substrate is provided with is 35 to 75%. When the porosity of the partition walls is lower than 35%, the gas permeability of the partition walls remarkably falls. The pressure loss incidence rate of the partition walls (increase in pressure loss generation in the partition walls) to the soot deposition amount (soot deposition increase amount) shows a tendency to increase in a linear form. However, in a state that soot does not deposit because of remarkably low gas permeation, the pressure loss incidence rate of the partition walls shows a tendency of further rise, which is not preferable. In addition, when the porosity is higher than 75%, the material strength falls, and a crack may be caused upon canning, which is not preferable.

In addition, it is preferable that the particles constituting the base material have an average particle diameter of 5 to 60 μm. When it is smaller than 5 μm, the number of particles present in a certain volume increases, and contact points between the particles increases. Therefore, upon firing the honeycomb-structured substrate, wettability of the contact points between the particles becomes strong, and as a result the pore tends to become remarkably small. Therefore, the pores are hardly formed, and the pressure loss incidence rate of the partition wall may rise to a large extent. In addition, when the average particle diameter of the particles constituting the base material is smaller than 5 μm in the case that particles are bonded with a bonding phase having a thermal conductivity lower than that of the particles, the bonding points between the particles become too many to deteriorate thermal conductivity, which increases a temperature distribution at high temperature. As a result, a crack may be caused. On the other hand, when it is larger than 60 μm, the bonding force falls because of the small number of the bonding points between the particles, and the strength of the base material falls. Therefore, a crack may be caused upon canning the honeycomb filter or upon regeneration. Incidentally, it is preferable that the porosity of the composite region is lower than that of the base material of the partition walls and that the porosity of the layer of the particle assemblages depositing on the partition walls is higher than that of the composite region. Such a constitution enables to rise the PM trapping efficiency of the honeycomb filter and to suppress the rate of occurrence of the pressure loss of the partition walls.

More specifically, setting can be performed in such a manner that the porosity of the partition walls is 35 to 75%, that the porosity of the composite region formed in the partition walls on the downstream side with respect to the surface layer reference line is lower than that of the partition walls by 5 to 30%, that the porosity of the particle layer of particle assemblages deposited on the upstream partition wall surface layer side with respect to the surface layer reference line (upstream partition wall surface side with respect to the surface layer reference line) is larger than that of the composite region formed in the partition walls on the downstream side with respect to the surface layer reference line by 5 to 40%, and that the porosity of the particle layer of particle assemblages deposited on the partition walls is 50 to 90%. When the porosity of the composite region formed on the partition walls on the downstream side with respect to the surface layer reference line is lower than the porosity of the partition walls by 5 to 30%, the necessary and sufficient exhaust gas passages can be secured, and the sufficient soot trapping performance can be secured. By securing the soot trapping performance, soot can be inhibited from passing through the composite region. By inhibiting the soot from passing through the composite region, the pressure loss incidence rate of the partition walls upon soot deposition due to soot deposition in the base material pores (pores of the partition walls) in the region below the composite region.

That is, when the fall of the porosity of the composite region in comparison with the partition walls outside the composite region is smaller than 5%, the composite region is not formed sufficiently. Therefore, soot passes through the composite region and deposits in the pores of the partition walls in the region below of the composite region. When soot deposits in the pores of the partition walls in this region, the pressure loss incidence rate of the partition walls rises to a large extent. In addition, when the fall of the porosity of the composite region in comparison with the partition walls outside the composite region is larger than 30%, the composite region is densified. As a result, the gas permeability falls to raise the pressure loss incidence rate of the partition walls to a large extent particularly in the high flow rate region (region where exhaust gas passes at high flow rates). In addition, when the porosity in the composite region above the surface layer reference line is higher than 40% with respect to the porosity in the composite region below the surface layer reference line, the change in porosity in the vicinity of the surface layer reference line becomes too large. As a result, since the bonding points between the particles decrease, peeling of a particle or a particle assemblage is easily caused in the vicinity of the surface layer reference line. In addition, when the porosity of the particle assemblage deposited in the composite region above the surface layer reference line in the composite region above the surface layer reference line or the particle layer of the particle assemblage deposited is smaller than 50%, since the flow rate of the soot passing through the pores upon the soot deposition in the gaps (space) between the particles is high, the pressure loss incidence rate of the partition walls rises to a large extent. In addition, when the porosity of the particle assemblages deposited in the composite region above the surface layer reference line or the particle layer of the particle assemblages is higher than 90%, the bonding points between the particles decrease extremely in the same manner as described above. As a result, the bonding strength of the particle assemblage falls, and peeling may be caused when it is exposed to high flow rate conditions (in the case that exhaust gas passes at high flow rates).

Incidentally, the porosity of the composite region is binarized in the image analysis of the SEM observation photograph of a resin-embedded polished surface, and the rate of the gaps (spaces) between the particles is determined as the porosity.

In addition, the "average pore diameter" and "porosity" of the base material of the partition walls in the present specification mean the average pore diameter and the porosity measured by mercury penetration method. The average pore diameter and the porosity of the particle assemblage deposited in the composite region or on the partition walls are measured by appropriately adding the measurement evaluation by subjecting an image taken by a SEM (scanning electron microscope) the binarization treatment. Specifically, the "average pore diameter" of the partition wall base material is determined by measuring the partition wall base material by mercury penetration method. When the pore distribution obtained by the measurement has two peaks, the pore diameter having the largest pore capacity of the distribution having a larger pore size is determined as the average pore diameter of the partition wall base material. On the other hand, in the case that the pore distribution obtained has only one peak and that the pore distribution of the partition wall base material cannot be identified, a desired region of a cross section perpendicular to the axial direction of the partition wall is subjected to resin-embedded polishing, the SEM (scanning electron microscope) observation is performed in the visual field of 100 to 1000 magnifications, and the image obtained is binarized to measure the average pore diameter of the partition wall base material. In the same manner, the "porosity" of the partition wall base material is measured in such a manner that a desired region of a cross section perpendicular to the axial direction of the partition wall is subjected to resin-embedded polishing, the SEM (scanning electron microscope) observation is performed in the visual field of 100 to 1000 magnifications, and the image obtained is binarized to obtain the porosity from the area ratio of the gaps to the particles in one visual field. In addition, the "particle diameter" of the partition wall base material is measured by the SEM image analysis as in the aforementioned measurements of the pore size and the porosity in the composite region. The maximum inscribed circle distribution is obtained with respect to the outermost contour of the particles constituting the base material, and the diameter distribution of the maximum inscribed circle is obtained. The maximum inscribed circle having a diameter smaller than 1 µm is determined that it is not a particle region, and D50 in the maximum inscribed circle distribution is determined as the average particle diameter of the base material.

Incidentally, "D50" means the size of the "50th" particle when particle diameters measured are aligned in order of size to determine the largest particle as the 100th particle.

Incidentally, it is preferable to have a relation where the average pore diameter of the composite region is made smaller than the average pore diameter of the partition walls and where the particle layer formed of particle assemblages deposited on the partition walls is made smaller than the average pore diameter of the composite region. Such constitution enables to raise the PM trapping efficiency in the honeycomb filter and suppress the pressure loss incidence rate of the partition walls. For example, the setting may be performed in such a manner that the average pore diameter of the partition walls is 10 to 20 µm, that the average pore diameter of the composite region is 5 to 10 µm, that the average pore diameter of the particle layer formed of particle assemblages deposited on the partition walls is 1 to 5 µm, and that each of the average pore diameter of the partition walls, the average pore diameter of the composite region, and the average pore diameter of the particle assemblages deposited on the partition walls and particle layers has the size relation among the aforementioned three average pore diameters.

Further, it is preferable that the thickness of the partition walls which the honeycomb-structured substrate is provided with is 200 to 600 µm. When it is smaller than 200 µm, soot deposited upon regeneration easily causes extraordinary combustion. Therefore, the internal temperature of the honeycomb filter or the internal temperature of the DPF when the honeycomb filter used as DPF rises, and a crack may be caused. On the other hand, when it is larger than 600 µm, the hydraulic diameter becomes too small, and the pressure loss incidence rate of the partition walls may rise.

Further, in a honeycomb filter of the present embodiment, it is preferable to have a structure where open end portions on one side and open end portions on the other side of the plural cells of the honeycomb-structured substrate are alternately plugged. For example, as shown in FIG. 3, the structure may be formed in such a manner that a honeycomb-structured body having plural cells 3 separated by partition walls 4 of porous ceramic having numeral pores and functioning as exhaust gas passages is employed as a base material and that the one side open end portions 11a and the other side open end portions 11b of the plural cells 3 are alternately plugged by plugging portions 8. In such a honeycomb-structured body, the exhaust gas $G_1$ is sent from the opening exhaust gas inflow cells 3 in the exhaust gas inflow side end face 7a, particulates in the exhaust gas $G_1$ are trapped by the partition walls 4 when the exhaust gas $G_1$ passes though the partition walls 4. Further, the exhaust gas $G_2$ from which the particulates are removed moves toward the exhaust gas outflow side end face 7b and is discharged outside of the honeycomb filter from the opening exhaust gas outflow cells 3.

Though there is no particular limitation on the material of the honeycomb-structured substrate, the ceramic can suitably be used, and silicon carbide (recrystallized silicon carbide, silicon-bonded silicon carbide, etc.) is preferable from the viewpoint of strength, thermal resistance, corrosion resistance, and the like.

In addition, the honeycomb-structured substrate can be obtained in such a manner that an organic binder (hydroxypropoxylmethyl cellulose, methylcellulose, etc.), a pore former (graphite, starch, synthetic resin, etc.), and a surfactant (ethylene glycol, fatty acid soap, etc.) are mixed as desired with the ceramic framework particles and water, and they are kneaded to obtain kneaded clay, the kneaded clay is formed into a desired shape and dried to obtain a formed body, and the formed body is fired.

In addition, an oxidation catalyst, other catalysts, and a purification material (hereinbelow, appropriately referred to as "catalyst and the like") may be loaded on a part of or the entire partition walls of the honeycomb-structured substrate and/or a part of or the entire composite region. That is, the catalyst and the like may be loaded on a part of or the entire partition walls, and the catalyst and the like may be loaded on a part of or the entire composite region. Further, a catalyst may be loaded on a part of or the entire partition walls and a part of or the entire composite region. In addition, for example, there may be loaded a NOx adsorber catalyst having an alkali metal (Li, Na, K, Cs, etc.) or an alkali earth metal (Ca, Ba, Sr, etc.), a ternary catalyst, an auxiliary catalyst represented by an oxide of cerium (Ce) and/or zirconium (Zr), HC (hydrocarbon) adsorber, or the like.

For example, the PM removal catalyst may contain Ce and at least one rare earth metal, alkali earth metal, or transition metal.

Here, the rare earth metal can be selected from, for example, Sm, Gd, Nd, Y, Zr, Ca, La, and Pr.

In addition, the alkali earth metal contained in the PM removal catalyst can be selected from, for example, Mg, Ca, Sr, and Ba.

In addition, the transition metal contained in the PM removal catalyst can be selected from Mn, Fe, Co, Ni, Cu, Zn, Sc, Ti, V, and Cr.

In addition, there is no particular limitation on the loading method of the catalyst component such as an oxidation catalyst and a NOx adsorber catalyst. An example of the method is a method where, after the partition walls of the honeycomb-structured body is subjected to wash coating with a catalyst solution containing a catalyst, it is subjected to a thermal treatment at high temperature for baking. Incidentally, the average pore diameter the thickness of the coat layer of the partition walls can be adjusted to be a desired value by controlling the particle size, the compounding ratio, and the like in the framework particles in the ceramic slurry; the porosity can be adjusted to be a desired value by controlling the particle size of the framework particles, the amount of the pore former, and the like in the ceramic slurry; and the thickness of the coat layer of the partition walls can be adjusted to be a desired value by controlling concentration of the ceramic slurry, time required for the membrane formation, and the like.

Incidentally, since the catalyst component such as an oxidation catalyst and a NOx adsorber catalyst is loaded in a highly dispersed state, it is preferable to load the catalyst component on the partition walls and the like of the honeycomb-structured body after once loading it on a thermal resistant inorganic oxide having a large specific surface area such as alumina in advance.

In addition, the aforementioned PM removal catalyst can be loaded by, for example, a method where catalyst slurry is loaded inside the pores of the partition walls by applying a conventionally known catalyst-loading method such as dipping or suction, followed by drying and firing.

An example of the production method of a honeycomb-structured body is the following method. However, without limiting to the production method of a honeycomb-structured body, a known production method of a honeycomb-structured body can be employed.

Figure 13:
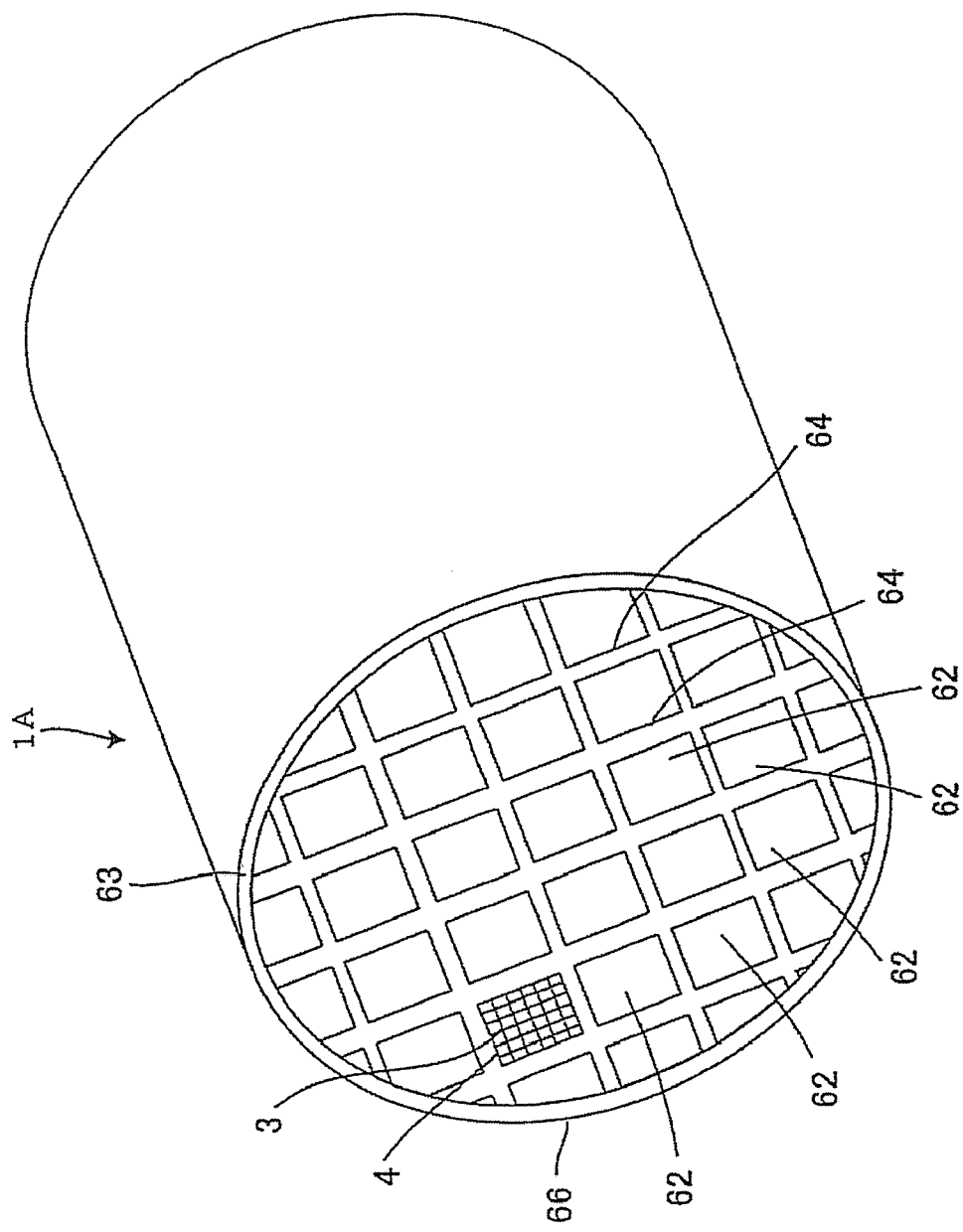
FIG. 13 is a schematic view showing a honeycomb filter where another embodiment of the present invention is applied and perspective view of the honeycomb filter.

In a case that a honeycomb-structured body is a honeycomb segment bonded body 63 composed of plural honeycomb segments 62 as shown in FIG. 13 and formed by bonding the segments with a bonding material 64 and subjecting the outer peripheral surface to cutting to have a desired shape, the method may be performed in the following procedure.

In the first place, honeycomb segments are produced. As the honeycomb segment raw material, for example, a SiC powder and a metal Si powder are mixed at a mass ratio of 80:20, and methyl cellulose, hydroxypropoxymethyl cellulose, a surfactant, and water are added to the mixture, and they are kneaded to obtain kneaded clay having plasticity. Then, the kneaded clay is subjected to extrusion forming using a predetermined die to obtain honeycomb segment formed bodies having a desired shape. Next, after the resultant honeycomb segment formed articles are dried with a microwave drier and further completely dried with a hot air drier, plugging is performed, followed by firing (calcination).

The calcination is performed for degreasing. The degreasing is performed, for example, at 550° C. for about three hours in an oxidation atmosphere. However, the conditions are not limited to these conditions, and it is preferable that the conditions are according to the organic matter (organic binder, dispersant, pore former, etc.) in the honeycomb formed body. Generally, since the combustion temperature of the organic binder is about 100 to 300° C., and the combustion temperature of the pore former is about 200 to 800° C., the calcination temperature is about 200 to 1000° C. Though there is no particular limitation on the calcination time, it is generally about 3 to 100 hours.

Further, the firing (main firing) is performed the "main firing" means an operation for securing predetermined strength by sintering the forming raw material in a calcined body for densification. Since the firing conditions (temperature and time) are different depending on the kind of the raw material, appropriate conditions may be selected in accordance with the kind. For example, a firing temperature in the case of firing in an Ar inert atmosphere is generally about 1400 to 1500° C. However, the temperature is not limited to the above range.

After the plural honeycomb segments (sintered bodies) having a desired size are obtained through the aforementioned steps, bonding slurry obtained by kneading aluminosilicate fiber, colloidal silica, polyvinyl alcohol, and silicon carbide is applied on the peripheral faces of the honeycomb segments, and the honeycomb segments are combined and press-fitted, followed by heating-drying to obtain a honeycomb segment bonded body having a quadrangular columnar entire shape. Then, after the honeycomb segment bonded body is cut to have a circular columnar shape, the peripheral faces are covered with an outer periphery coat layer of the same material as that for the honeycomb segment formed body, followed by drying and hardening to obtain a circular columnar honeycomb-structured body having a segment structure.

As a method for forming plugging portions, plugging slurry is stored in a storage container. Then, an end portion having the aforementioned mask applied thereto is immersed in the slurry in the storage container to fill the plugging slurry into the opening portions of the cells having no mask, thereby forming plugging portions. A mask is applied to the other end portions of the cells plugged in the one end portions, and plugging portions are formed in the same manner as in the formation of plugging portions on the aforementioned one end portions. Thus, the other end portions of the cells which are not plugged in the aforementioned one side end portions are plugged to have a structure where the cells are alternately plugged in the checkerwise pattern on the other end portions. In addition, the plugging may be performed after the honeycomb fired body is formed by firing the honeycomb formed body.

Incidentally, when the same material as the honeycomb segment raw material is used as the plugging material, the expansion coefficient upon firing can be made the same as that of the honeycomb segments to improve durability, which is preferable.

Incidentally, as a forming method, a method where kneaded clay prepared as described above is subjected to extrusion forming using a die having a desired cell shape, partition wall thickness, and cell density can suitably be employed.

Incidentally, a honeycomb filter of the present invention can suitably be used as a diesel particulate filter (DPF) for trapping particulate matter (PM) discharged from a diesel engine.

[2-1] First Production Method of the Present Invention:

As an embodiment of the first production method of a honeycomb filter of the present invention, it is preferable that the method includes the steps of: forming a honeycomb formed body by subjecting a forming raw material containing a ceramic raw material to extrusion forming and forming plugging portions in one side open end portions and the other side open end portions of the other cells of the honeycomb formed body, firing the honeycomb formed body to form a honeycomb fired body, supplying particles having an average particle diameter smaller than that of the particles constituting the partition walls from the one side open end portions of the honeycomb fired body by a solid-gas two-phase flow, and, at least in open pores formed by the particles constituting the partition wall and/or gaps between the particles, forming a composite region by depositing particles having an average particle diameter smaller than that of the aforementioned particles in a surface layer portion of the partition walls on the exhaust gas inflow side; wherein the partition walls have an average pore diameter of 5 to 40 μm and a porosity of 35 to 75%, the particles deposited has an average particle diameter of 1 to 15 μm, and the composite region has a height of 80 μm or less with respect to the partition wall surface direction from the outermost contour line of the partition walls. By such production, the contact area between the deposited particles is decreased, and securing of the gaps between the particles, that is, passages becomes easy, and pressure loss can be suppressed.

Specifically, in the first place, as described above, the forming raw material containing a ceramic raw material is subjected to extrusion forming to form a honeycomb formed body provided with partition walls separating and forming plural cells functioning as fluid passages and extending over from one side end face to the other side end face. Next, a honeycomb-structured body where plugging portions are formed in one side open end portions and the other side open end portions of the other cells of the honeycomb formed body is prepared.

Further, a honeycomb-structured body was subjected to firing (main firing) to form a honeycomb fired body. Since the firing conditions (temperature and time) here are different depending on the kind of the raw material, suitable conditions may be selected in accordance with the kind. For example, the firing temperature in the case of firing in the Ar inert atmosphere is generally about 1400 to 1500° C., and firing time is 1 to 20 hours. However, the conditions are not limited to these.

Further, from one side open end portions of the aforementioned honeycomb fired body, particles having the average particle diameter smaller than that of the particles constituting the partition walls are supplied by a solid-gas two-phase flow to deposit the particles having the average particle diameter smaller than that of the particles constituting the partition walls at least in open pores formed by the particles constituting the partition wall and/or gaps between the particles. Thus, a honeycomb filter having at least the composite region can be obtained.

For example, as a method for depositing the particles having an average particle diameter smaller than that of the particles constituting the partition walls by supplying them by a solid-gas two-phase flow, there is a method where the air containing particles to be deposited in the open pores formed by the particles constituting the partition wall and/or the gap between the particles is sent into the honeycomb filter (DPF) from the exhaust gas inlet side end face (end face on the exhaust gas inlet side of the DPF) of the honeycomb filter. Such a method enables to form the composite region by gradually depositing particles in the open pores formed in the partition walls of the cells (inlet cells) where the inlet of the gas is open and/or the gaps between the particles and on the partition walls. Further, by sucking the particles from the exhaust gas inlet side end face (exhaust gas inlet side end face of the DPF) of the honeycomb filter, the particles are introduced into the partition wall pores to be able to further stabilize the deposition state.

Incidentally, upon depositing particles in the open pores and/or in the gap between the particles as necessary, it is preferable to supply the particles having an average particle diameter smaller than that of the particles constituting the partition walls by a solid-gas two-phase flow by setting the open end portion where the exhaust gas flows in of the honeycomb fired body after the honeycomb formed body is fired to face downward to form a honeycomb fired body. This makes deposition of the particles easy on the surface layer portions of the partition walls on the exhaust gas inflow side and on the partition wall surface layer portions in a desired region, thereby making formation easy.

Further, a segment-joined honeycomb segment bonded body where plural honeycomb fired bodies each having a composite region formed therein are bonded with a bonding material is formed, and grinding is performed to obtain a circular shape, an oval shape, a race track shape, or the like. Further, it is possible to coat the outer periphery with a coating material.

[2-2] Second Production Method of the Present Invention:

As an embodiment of the second production method of a honeycomb filter of the present invention, it is also preferable that the method includes the steps of: forming a honeycomb formed body by subjecting a forming raw material containing a ceramic raw material to extrusion forming and forming plugging portions in one side open end portions and the other side open end portions of the other cells of the honeycomb formed body, firing the honeycomb formed body to form a honeycomb fired article, supplying particles having an average particle diameter smaller than that of the particles constituting the partition walls from the one side open end portions of the honeycomb fired article by a solid-gas two-phase flow, at least in open pores formed by the particles constituting the partition wall and/or gaps between the particles, forming a composite region by depositing particles having an average particle diameter smaller than that of the aforementioned particles in a surface layer portion of the partition walls on the exhaust gas inflow side, and further performing a thermal treatment; wherein the partition walls have an average pore diameter of 5 to 40 μm and a porosity of 35 to 75%, the particles deposited has an average particle diameter of 1 to 15 μm, and the composite region has a height of 80 μm or less with respect to the partition wall surface direction from the outermost contour line of the partition walls. That is, it is desirable that, after the step forming a desired composite region, a thermal treatment step is further performed to produce a honeycomb filter. By such a thermal treatment, the particles to be deposited, particle assemblages, the particle layers, and/or surfaces of the partition walls can be bonded sufficiently, and durability of the composite region can be improved.

Incidentally, in the second production method of a honeycomb filter of the present invention, a series of steps from the step of extrusion-forming a forming raw material containing a ceramic raw material to the step of depositing the particles by the solid-gas two-phase flow on the honeycomb fired body are the same as in the first production method of a honeycomb filter of the present invention. Therefore, here, the thermal treatment step after the particles are deposited will be described, and regarding a series of the step described above, please refer to the first production method of a honeycomb filter of the present invention.

A honeycomb filter having a composite region formed in the aforementioned manner is further subjected to a thermal treatment. The thermal treatment is performed for bonding the particle assemblage and/or the particle layers to the particle layers, and the surfaces of the aforementioned partition walls and is different from the calcination and the main firing for obtaining a honeycomb fired body.

Incidentally, as examples of the thermal treatment conditions (temperature and time), the maximum temperature is 1200 to 1350° C. in an ambient atmosphere, and the time for keeping the target maximum temperature is 30 to 300 minutes.

Thus, after the aforementioned particle assemblages, and/or the particle layers, and the surfaces of the aforementioned partition walls are bonded together, a honeycomb segment-joined type honeycomb segment bonded body bonded with a bonding material is formed. Further, it is also possible to perform grinding to obtain a circular shape, an oval shape, a race track shape, or the like and to further coat the outer periphery with a coating material.

Incidentally, after a product is completed, a catalyst coat step is performed to obtain a honeycomb filter with a catalyst in both the first production method and the second production method of a honeycomb filter of the present invention. The catalyst distribution, composition, and the like of the catalyst used in the catalyst coat step are as shown in [0098] to [0102], and the catalyst coat method is as shown in [0103] to [0105].

[2-3] Third Production Method of the Present Invention:

As an embodiment of the third production method of a honeycomb filter of the present invention, it is also desirable that the method includes the steps of: forming a honeycomb formed body by subjecting a forming raw material containing a ceramic raw material to extrusion forming and forming plugging portions in one side open end portions and the other side open end portions of the other cells of the honeycomb formed body, firing the honeycomb formed body to form a honeycomb fired body, loading a catalyst on the partition walls of the honeycomb fired body to obtain a catalyst-loaded honeycomb-structured body, supplying particles having an average particle diameter smaller than that of the particles constituting the partition walls from the one side open end portions of the catalyst-loaded honeycomb-structured body by a solid-gas two-phase flow, at least in open pores formed by the particles constituting the partition wall and/or gaps between the particles, forming a composite region by depositing particles having an average particle diameter smaller than that of the aforementioned particles in a surface layer portion of the partition walls on the exhaust gas inflow side, and further performing a thermal treatment; wherein the partition walls have an average pore diameter of 5 to 40 μm and a porosity of 35 to 75%, the particles deposited have an average particle diameter of 1 to 15 μm, and the composite region has a height of 80 μm or less with respect to the partition wall surface direction from the outermost contour line of the partition walls. Thus, since the composite region is formed after the catalyst is coated, there is no substantial deposition of a catalyst in the composite region. Therefore, the clogging of the gaps (spaces) between the particles in the composite region is not caused substantially. As a result, there is little concern about the rise of the pressure loss incidence rate of the partition walls. In addition, upon coating the catalyst, it is not necessary to pay attention to avoiding the clogging in the composite region with the coating of a catalyst in the composite region. Therefore, the restriction of the catalyst coat step is small, and catalyst coat can be performed at low costs.

In the first place, in the third production method of a honeycomb filter of the present invention, a series of steps from the step of subjecting a forming raw material containing the ceramic raw material to extrusion forming to the step of obtaining a honeycomb fired body are performed in the same manner as in the first production method of a honeycomb filter of the present invention. Next, a catalyst is coated on the honeycomb fired body (segments because they are not yet bonded). Incidentally, the catalyst distribution, component, and the like of the catalyst used in the catalyst coating step are as shown in [0098] to [0102], and the catalyst coating method is as shown in [0103] to [0105].

Further, after the catalyst is coated, the composite region is formed in the same manner as in the second production method of a honeycomb filter of the present invention on the honeycomb fired body with a catalyst coating (with a catalyst). Then, through the thermal treatment step in the same manner as in the second production method of a honeycomb filter of the present invention, the segment-joined type honeycomb segment bonded body bonded with a bonding material is formed. Further, grinding is performed to obtain a circular shape, an oval shape, a race track shape, or the like to further coat the outer periphery with a coating material to produce a honeycomb filter with a catalyst.

Incidentally, regarding the catalyst coating method in the third production method of the present invention, the following catalyst coating method may be employed besides the catalyst coating method (see [0103] to [0105]) described above. For example, after catalyst slurry is coated by dipping, suction, or the like, surplus slurry is blown away by air blow. Then, without the drying step, particles are deposited in a wet state after the air blow unlike the conventional method where the drying step follows. Then, a thermal treatment step including both a catalyst-drying step and a thermal treatment step for forming the composite region is performed. By employing such a catalyst coating method, the treatment steps in catalyst coat can be reduced to be able to plan the reduction in costs. Incidentally, as the thermal treatment conditions in a thermal treatment step including both a catalyst-drying step and a thermal treatment step for forming the composite region, the maximum temperature is 450 to 750° C. in an ambient atmosphere, and the time for keeping the target maximum temperature is 30 to 180 minutes.

Further, it is also preferable that, in addition to the third production method of a honeycomb filter of the present invention, the method includes the steps of: supplying particles having an average particle diameter smaller than that of the particles constituting the partition walls from one side open end portion of the honeycomb fired body by a solid-gas two-phase flow, and simultaneously, sucking the particles from the other open end portions of the honeycomb fired body to deposit the particles in the pores formed in the partition walls on the exhaust gas inflow side to form a composite region. By thus sucking the particles from the downstream side (the other open end portion side of the honeycomb fired body) simultaneously with sending the carrier air carrying the particles, particles can stably be deposited on the honeycomb fired body in a short period of time.

EXAMPLE

Hereinbelow, the present invention will be described more specifically by Examples. However, the present invention is by no means limited to these Examples. Incidentally, "part" and "%" in the following Examples and Comparative Examples mean mass part and mass % unless otherwise noted. In addition, the various evaluations and measurements in Examples were carried out by the following methods.

[1] Full Load Pressure Loss:

In order to evaluate the pressure loss in the state of no soot deposition, a DPF was mounted on a 2.2 L engine, and, after the engine warm up for five minutes, a full load state at 4000 rpm was kept for five minutes to measure the pressure loss on the front and back of the honeycomb filter (DPF) at that time.

[2] Pressure Loss with Soot

In order to evaluate the pressure loss at the time of soot deposition, a DPF is mounted on the same engine, and, with constantly depositing soot with 200 rpm×50 Nm, the behavior of the pressure loss rise was measured. After the test, the weight was measured to confirm the deposited soot amount.

[3] Trapping Efficiency:

Upon measuring the pressure loss with soot of [2], the soot amount on the front and back of the DPF (gas inlet side and gas outlet side of the DPF) right after the DPF was mounted on the engine was measured with the SMPS (Scanning Mobility Particle Sizer produced by TSI Incorporated) to calculate the trapping efficiency of the DPF.

[4] Isostatic Strength Test:

The DPF was covered with a rubber cover lest water should enter the inside of the DPF, and hydrostatic pressure was applied to the DPF in water to measure the pressure where the DPF was destroyed.

Example 1

A SiC powder and a metal Si powder were mixed together at the mass ratio of 80:20; methyl cellulose, hydroxypropoxylmethyl cellulose, a surfactant, and water were added to the mixture, followed by kneading to obtain kneaded clay having plasticity; and the kneaded clay was subjected to extrusion forming using a predetermined die to obtain a total of 16 (4×4) honeycomb segments having a desired shape. Next, after the honeycomb segment formed bodies obtained above were dried with a microwave drier and further dried completely with a hot air drier, plugging was performed, and firing (calcination) was performed. The condition of the calcination was 550° C. for three hours in an oxidation atmosphere. Then, firing (main firing) was performed. The firing conditions (temperature and time) were 1400° C. for two hours in an Ar inert atmosphere.

From the open end portions on the exhaust gas inflow side of the honeycomb segments obtained above, SiC particles having an average particle diameter of 3 μm were supplied by a solid-gas two-phase flow to deposit the SiC particles having an average particle diameter of 3 μm in the open pores formed by the particles constituting the partition walls and/or the gap between the particles in the surface layer portion of the partition walls on the exhaust gas inlet side to form a composite region. Next, a thermal treatment was performed at the maximum temperature of 1300° C. with the maximum temperature keeping time of two hours to bond the SiC particles together and bond the SiC particles and the partition walls. Thus, there were obtained honeycomb segments (composite region-formed bodies) having a rib thickness (partition wall thickness) of 300 μm, a cell pitch of 1.47 mm, a porosity of 40%, an average pore diameter of 15 μm, and an average particle diameter (particles constituting the partition walls) of 50 μm as partition wall properties and an average particle diameter of 3 μm, a composite region depth (composite region thickness in the partition wall thickness direction) of 10 μm, a composite region depth rate (rate of the composite region depth with respect to the partition wall thickness) of 3.3%, and a distance from the outermost contour line of 20 μm as the composite region/layer properties. On the peripheral face of each of the honeycomb segments obtained above was applied bonding slurry obtained by kneading aluminosilicate fibers, colloidal silica, polyvinyl alcohol, and silicon carbide, and the segments were combined and press-fitted, followed by heating-drying to obtain a honeycomb segment bonded body having an entire quadrangular columnar shape. Further, after the honeycomb segment bonded body was ground into a circular columnar shape, the peripheral face was covered with an outer periphery coat layer formed of the same material as the bonding slurry, followed by drying for hardening to obtain a circular columnar honeycomb-structured body having a segment structure having a diameter of 144 mm, a length of 152 mm, a partition wall thickness of 300 μm, and a cell density of 46.5 cells/cm².

Next, a catalyst was loaded on the partition walls of the honeycomb-structured body obtained above. In the first place, there was previously prepared slurry of a catalyst containing alumina, platinum, and ceria based material at a proportion of 7:1:2 (mass ratio) with the ceria based material containing Ce, Zr, Pr, Y, and Mn at a proportion of 60:20:10:5:5 (mass ratio). Next, the honeycomb-structured body was immersed up to a predetermined height from the outlet end face (exhaust gas outflow side end face), and suction is performed for a predetermined period of time with adjusting the suction pressure and the suction flow rate to have predetermined suction pressure and suction flow rate to load a catalyst on the partition walls, followed by drying at 120° C. for two hours and baking at 550° C. for one hour to obtain a catalyst-loaded honeycomb filter of Example 1. The aforementioned experiments [1] to [3] were performed. The partition wall properties, composite region/layer properties, and the experiment results are shown in Table 1.

TABLE 1

| | Partition wall property | | | | | Composite region/layer property | | | | Evaluation result | | | |
|---|---|---|---|---|---|---|---|---|---|---|---|---|---|
| No. | Rib thickness [μm] | Cell pitch [mm] | Porosity [%] | Average pore diameter [μm] | Average particle diameter [μm] | Average Particle diameter [μm] | Composite region depth [μm] | Composite region depth rate [%] | Distance from outermost contour line [μm] | Full load pressure loss [kPa] | Pressure loss with soot [kPa] | Trapping efficiency [%] | Isostatic strength [MPa] |
| Comp. Ex. 1 | 300 | 1.47 | 40 | 15 | 50 | 3 | 0 | 0 | 50 | 32 | 17 | 82 | — |
| Comp. Ex. 2 | 300 | 1.47 | 40 | 15 | 50 | 3 | 0 | 0 | 20 | 26 | 16 | 69 | — |
| Comp. Ex. 3 | 300 | 1.47 | 40 | 15 | 50 | — | 0 | 0 | 0 | 18 | 18 | 61 | — |
| Example 1 | 300 | 1.47 | 40 | 15 | 50 | 3 | 10 | 3.3 | 20 | 16 | 9 | 85 | — |
| Example 2 | 300 | 1.47 | 40 | 15 | 50 | 3 | 20 | 6.7 | 20 | 16 | 9 | 88 | — |
| Example 3 | 300 | 1.47 | 40 | 15 | 50 | 3 | 50 | 16.7 | 20 | 16 | 9 | 89 | — |
| Example 4 | 300 | 1.47 | 40 | 15 | 50 | 3 | 80 | 26.7 | 20 | 16 | 9 | 88 | — |
| Example 5 | 300 | 1.47 | 40 | 15 | 50 | 3 | 90 | 30.0 | 20 | 16 | 10 | 89 | — |
| Example 6 | 300 | 1.47 | 40 | 15 | 50 | 3 | 100 | 33.3 | 20 | 18 | 18 | 89 | — |
| Comp. Ex. 4 | 300 | 1.47 | 40 | 15 | 50 | 0.5 | 20 | 6.7 | 20 | 26 | 19 | 89 | — |
| Comp. Ex. 5 | 300 | 1.47 | 40 | 15 | 50 | 0.8 | 20 | 6.7 | 20 | 24 | 17 | 89 | — |
| Example 7 | 300 | 1.47 | 40 | 15 | 50 | 1 | 20 | 6.7 | 20 | 17 | 9 | 88 | — |
| Example 8 | 300 | 1.47 | 40 | 15 | 50 | 5 | 20 | 6.7 | 20 | 16 | 9 | 87 | — |
| Example 9 | 300 | 1.47 | 40 | 15 | 50 | 15 | 20 | 6.7 | 20 | 16 | 9 | 83 | — |
| Comp. Ex. 6 | 300 | 1.47 | 40 | 15 | 50 | 18 | 20 | 6.7 | 20 | 16 | 9 | 68 | — |
| Comp. Ex. 7 | 300 | 1.47 | 40 | 15 | 50 | 3 | 20 | 6.7 | 82 | 28 | 16 | 89 | — |
| Example 10 | 300 | 1.47 | 40 | 15 | 50 | 3 | 20 | 6.7 | 80 | 19 | 9 | 88 | — |
| Example 11 | 300 | 1.47 | 40 | 15 | 50 | 3 | 20 | 6.7 | 70 | 17 | 9 | 88 | — |
| Example 12 | 300 | 1.47 | 40 | 15 | 50 | 3 | 20 | 6.7 | 50 | 18 | 9 | 89 | — |
| Example 13 | 300 | 1.47 | 40 | 15 | 50 | 3 | 20 | 6.7 | 30 | 18 | 10 | 88 | — |
| Example 14 | 300 | 1.47 | 40 | 15 | 50 | 3 | 20 | 6.7 | 10 | 16 | 9 | 89 | — |
| Example 15 | 300 | 1.47 | 40 | 15 | 50 | 3 | 20 | 6.7 | 5 | 16 | 9 | 89 | — |

Example 2 to 6

There were obtained honeycomb segments (composite region-formed bodies) provided with the same partition wall properties as in Example 1 and different from Example 1 in that the composite region depth (thickness of the composite region in the partition wall thickness) was 20 μm and that the composite region depth rate (rate of the composite region depth with respect to the partition wall thickness) was 6.7%. Further, through the same steps as in Example 1, honeycomb segment bonded articles were obtained. After the honeycomb segment bonded articles were subjected to grinding into a circular columnar shape, the peripheral face was coated with an outer periphery coat layer of a material equivalent to the bonding slurry, followed by drying for hardening to obtain a circular columnar honeycomb-structured body having a segment structure having a diameter of 144 mm, a length of 152 mm, a partition wall thickness of 300 μm, and a cell density of 46.5 cells/cm$^2$. A catalyst was loaded on the honeycomb-structured body obtained above in the same manner as in Example 1 to obtain a honeycomb filter of Example 2. Incidentally, since Examples 3 to 24 employ a circular columnar honeycomb filter having a segment structure having a diameter of 144 mm, a length of 152 mm, a partition wall thickness of 300 μm, and a cell density of 46.5 cells/cm$^2$, the description will be omitted. In the same manner, in Example 3, after the honeycomb segments (composite region-formed bodies) were obtained in the same manner as in Example 1 except that the composite region depth (thickness of the composite region in the direction of partition wall thickness) was 50 μm and that the composite region depth rate (composite region depth rate with respect to the thickness of the partition wall) was 16.7% as the composite region/layer properties, a honeycomb filter was obtained through the same steps as in Example 1. In the same manner, in Example 4, after honeycomb segments (composite region-formed bodies) were obtained in the same manner as in Example 1 except that the composite region depth (thickness of the composite region in the direction of partition wall thickness) was 80 μm and that the composite region depth rate (composite region depth rate with respect to the thickness of the partition wall) was 26.7% as the composite region/layer properties, a honeycomb filter was obtained through the same steps as in Example 1. In the same manner, in Example 5, after honeycomb segments (composite region-formed bodies) were obtained in the same manner as in Example 1 except that the composite region depth (thickness of the composite region in the direction of partition wall thickness) was 90 μm and that the composite region depth rate (composite region depth rate with respect to the thickness of the partition wall) was 30.0% as the composite region/layer properties, a honeycomb filter was obtained through the same steps as in Example 1. In the same manner, in Example 6, after honeycomb segments (composite region-formed bodies) were obtained in the same manner as in Example 1 except that the composite region depth (thickness of the composite region in the direction of partition wall thickness) was 100 μm and that the composite region depth rate (composite region depth rate with respect to the thickness of the partition wall) was 33.3% as the composite region/layer properties, a honeycomb filter was obtained through the same steps as in Example 1. This was used as Example 6. The thus obtained catalyst-loaded honeycomb filters of Examples 2 to 6 were subjected to the aforementioned experiments [1] to [3]. The results of the experiments, partition wall properties, and composite region/layer properties are shown in Table 1.

Examples 7 to 9

In addition, after honeycomb segments (composite region-formed bodies) which were the same as those of Example 2 except that the average particle diameter was 1 μm as a composite region/layer property were obtained, a honeycomb filter was obtained through the same steps as in Example 1. This was employed as Example 7. In addition, after honeycomb segments (composite region-formed articles) which were the same as those of Example 2 except that the average particle diameter was 5 μm as a composite region/layer property were obtained, a honeycomb filter was obtained through the same steps as in Example 1. This was employed as Example 8. In addition, honeycomb segments (composite region-formed bodies) which were the same as those of Example 2 except that the average particle diameter was 15 μm as a composite region/layer property were obtained, a honeycomb filter was obtained through the same steps as in Example 1. This was employed as Example 9. The thus obtained catalyst-loaded honeycomb filters of Examples 7 to 9 were subjected to the aforementioned experiments [1] to [3]. The results of the experiments, partition wall properties, and composite region/layer properties are shown in Table 1.

Examples 10 to 15

In addition, after honeycomb segments (composite region-formed bodies) which were the same as those of Example 2 except that the distance from the outermost contour line was 80 μm as a composite region/layer property were obtained, a honeycomb filter was obtained through the same steps as in Example 1. This was employed as Example 10. In addition, after honeycomb segments (composite region-formed articles) which were the same as those of Example 2 except that the distance from the outermost contour line was 70 μm as a composite region/layer property were obtained, a honeycomb filter was obtained through the same steps as in Example 1. This was employed as Example 11. In addition, after honeycomb segments (composite region-formed bodies) which were the same as those of Example 2 except that the distance from the outermost contour line was 50 μm as a composite region/layer property were obtained, a honeycomb filter was obtained through the same steps as in Example 1. This was employed as Example 12. In addition, after honeycomb segments (composite region-formed bodies) which were the same as those of Example 2 except that the distance from the outermost contour line was 30 μm as a composite region/layer property were obtained, a honeycomb filter was obtained through the same steps as in Example 1. This was employed as Example 13. In addition, after honeycomb segments (composite region-formed bodies) which were the same as those of Example 2 except that the distance from the outermost contour line was 10 μm as a composite region/layer property were obtained, a honeycomb filter was obtained through the same steps as in Example 1. This was employed as Example 14. In addition, after honeycomb segments (composite region-formed bodies) which were the same as those of Example 2 except that the distance from the outermost contour line was 5 μm as a composite region/layer property were obtained, a honeycomb filter was obtained through the same steps as in Example 1. This was employed as Example 15. The thus obtained catalyst-loaded honeycomb filters of Examples 10 to 15 were subjected to the aforementioned experiments [1] to [3]. The results of the experiments, partition wall properties, and composite region/layer properties are shown in Table 1.

Examples 16 to 19

In addition, after honeycomb segments (composite region-formed bodies) which were the same as those of Example 2 except that the porosity was 35% and that the average particle diameter was 45 μm as partition wall properties were obtained with adjusting the particle diameter distribution (sharp, broad, two peak distribution, etc.) and the pore former (particle diameter, particle diameter distribution, and addition amount), a honeycomb filter was obtained through the same steps as in Example 1. This was employed as Example 16. In the same manner, after honeycomb segments (composite region-formed articles) which were the same as those of Example 2 except that the porosity was 50% and that the average particle diameter was 40 μm as partition wall properties were obtained, a honeycomb filter was obtained through the same steps as in Example 1. This was employed as Example 17. In the same manner, after honeycomb segments (composite region-formed bodies) which were the same as those of Example 2 except that the porosity was 60% and that the average particle diameter was 35 μm as partition wall properties were obtained, a honeycomb filter was obtained through the same steps as in Example 1. This was employed as Example 18. In the same manner, after honeycomb segments (composite region-formed bodies) which were the same as those of Example 2 except that the porosity was 75% and that the average particle diameter was 25 μm as partition wall properties were obtained, a honeycomb filter was obtained through the same steps as in Example 1. This was employed as Example 19. The thus obtained honeycomb filters with a catalyst of Examples 16 to 19 were subjected to the aforementioned experiments [1] to [4]. The results of the experiments, partition wall properties, and composite region/layer properties are shown in Table 2.

Examples 20 to 24

In addition, after honeycomb segments (composite region-formed bodies) which were the same as those of Example 2 except that the average pore diameter was 5 μm and that the average particle diameter was 10 μm as partition wall properties were obtained, a honeycomb filter was obtained through the same steps as in Example 1. This was employed as Example 20. In addition, after honeycomb segments (composite region-formed bodies) which were the same as those of Example 2 except that the average pore diameter was 10 μm and that the average particle diameter was 35 μm as partition wall properties were obtained, a honeycomb filter was obtained through the same steps as in Example 1. This was employed as Example 21. In addition, after honeycomb segments (composite region-formed bodies) which were the same as those of Example 2 except that the average pore diameter was 30 μm as a partition wall property were obtained, a honeycomb filter was obtained through the same steps as in Example 1. This was employed as Example 22. In addition, after honeycomb segments (composite region-formed bodies) which were the same as those of Example 2 except that the average pore diameter was 35 μm and that the average particle diameter was 60 μm as partition wall properties were obtained, a honeycomb filter was obtained through the same steps as in Example 1. This was employed as Example 23. In addition, after honeycomb segments (composite region-formed bodies) which were the same as those of Example 2 except that the average pore diameter was 40 μm and that the average particle diameter was 65 μm as partition wall properties were obtained, a honeycomb filter was obtained through the same steps as in Example 1. This was employed as Example 24. The thus obtained honeycomb filters with a catalyst of Examples 20 to 24 were subjected to the aforementioned experiments [1] to [3]. The results of the experiments, partition wall properties, and composite region/layer properties are shown in Table 2.

TABLE 2

| No. | Partition wall property | | | | | Composite region/layer property | | | | Evaluation result | | | |
|---|---|---|---|---|---|---|---|---|---|---|---|---|---|
| | Rib thickness [μm] | Cell pitch [mm] | Porosity [%] | Average pore diameter [μm] | Average particle diameter [μm] | Average Particle diameter [μm] | Composite region depth [μm] | Composite region depth rate [%] | Distance from outermost contour line [μm] | Full load pressure loss [kPa] | Pressure loss with soot [kPa] | Trapping efficiency [%] | Isostatic strength [MPa] |
| Comp. Ex. 8 | 300 | 1.47 | 33 | 15 | 50 | 3 | 20 | 6.7 | 20 | 34 | 18 | 89 | 4.2 |
| Example 16 | 300 | 1.47 | 35 | 15 | 45 | 3 | 20 | 6.7 | 20 | 17 | 10 | 89 | 4 |
| Example 17 | 300 | 1.47 | 50 | 15 | 40 | 3 | 20 | 6.7 | 20 | 16 | 9 | 88 | 3.3 |
| Example 18 | 300 | 1.47 | 60 | 15 | 35 | 3 | 20 | 6.7 | 20 | 16 | 9 | 89 | 2.8 |
| Example 19 | 300 | 1.47 | 75 | 15 | 25 | 3 | 20 | 6.7 | 20 | 16 | 9 | 89 | 1.4 |
| Comp. Ex. 9 | 300 | 1.47 | 78 | 15 | 20 | 3 | 20 | 6.7 | 20 | 16 | 9 | 88 | 0.8 |
| Comp. Ex. 10 | 300 | 1.47 | 40 | 4 | 10 | 3 | 20 | 6.7 | 20 | 36 | 17 | 92 | — |
| Example 20 | 300 | 1.47 | 40 | 5 | 10 | 3 | 20 | 6.7 | 20 | 18 | 10 | 89 | — |
| Example 21 | 300 | 1.47 | 40 | 10 | 35 | 3 | 20 | 6.7 | 20 | 17 | 9 | 89 | — |
| Example 22 | 300 | 1.47 | 40 | 30 | 50 | 3 | 20 | 6.7 | 20 | 16 | 9 | 88 | — |
| Example 23 | 300 | 1.47 | 40 | 35 | 60 | 3 | 20 | 6.7 | 20 | 16 | 9 | 88 | — |
| Example 24 | 300 | 1.47 | 40 | 40 | 65 | 3 | 20 | 6.7 | 20 | 16 | 9 | 85 | — |
| Comp. Ex. 11 | 300 | 1.47 | 40 | 43 | 65 | 3 | 20 | 6.7 | 20 | 19 | 9 | 68 | — |

Comparative Example 1 to 3

There were obtained honeycomb segment bonded body having an entire quadrangular columnar shape by applying bonding slurry obtained by kneading aluminosilicate fibers, colloidal silica, polyvinyl alcohol, and silicon carbide on the peripheral faces of the honeycomb segments as it is without supplying p bodies in the composite region after the honeycomb segments were obtained in the same manner as in Example 1, joining the honeycomb segments and press-fitting them, followed by heating-drying. Further, after grinding the honeycomb segment bonded body into a circular columnar shape, the peripheral face was coated with the outer periphery coat layer formed of a material equivalent to the bonding slurry, followed by drying for hardening to obtain a circular columnar honeycomb filter having a segment structure having a diameter of 144 mm, a length of 152 mm, a partition wall thickness of 300 μm, and a cell density of 46.5 cells/cm². Incidentally, since Comparative Examples 2 to 11 employ a circular columnar honeycomb filter having a segment structure having a diameter of 144 mm, a length of 152 mm, a partition wall thickness of 300 μm, and a cell density of 46.5 cells/cm$^2$, the description will be omitted. Further, in the same manner as in Example 1, catalyst coating was performed to obtain a catalyst-loaded honeycomb filter. The catalyst-loaded honeycomb filter had a rib thickness (partition wall thickness) of 300 μm, a cell pitch of 1.47 mm, a porosity of 40%, an average pore diameter of 15 μm, and an average particle diameter (of particles constituting the partition walls) of 50 μm as partition wall properties and an average particle diameter of 3 μm, a composite region depth (thickness of the composite region in the direction of partition wall thickness) of 0 μm, a composite region depth rate (the rate of the composite region depth with respect to the partition wall thickness) of 0%, and a distance from the outermost contour line of 50 μm as composite region/layer properties, and it was employed as Comparative Example 1. In the same manner, a catalyst-loaded honeycomb filter which was the same as that of Comparative Example 1 except that the distance from the outermost contour line was 20 μm was employed as Comparative Example 2. In the same manner, a catalyst-loaded honeycomb filter which was the same as that of Comparative Example 1 except that the distance from the outermost contour line was 0 μm with "-" for the "average particle diameter" was employed as Comparative Example 3. Thus, the Comparative Examples 1 to 3 were subjected to the aforementioned experiments [1] to [3]. The results are shown in Table 1.

Incidentally, in Comparative Examples 1 to 3 shown in Table 1, that the "composite region depth" was "0" in the "composite region/layer properties" means that there was no particle deposition in the composite region on the downstream side of the surface layer reference line and that particles were deposited only above the surface layer reference line (on the partition wall surface layer side on the upstream side of the surface layer reference line (partition wall surface side on the upstream side of the surface layer reference line)). In the same manner, the "average particle diameter" in the "composite region/layer properties" of Comparative Examples 1 and 2 shows the particle diameter of the particle assemblages present on the upstream side of the surface layer reference line (on the partition wall surface layer side on the upstream side of the surface layer reference line (partition wall surface side on the upstream side of the surface layer reference line)). Incidentally, the "distance from the outermost contour line" in the "composite region/layer properties" shows the distance from the outermost contour line to the particle assemblages present on the upstream side of the surface layer reference line (on the partition wall surface layer side on the upstream side of the surface layer reference line (partition wall surface side on the upstream side of the surface layer reference line)). In addition, that the "average particle diameter" in the "composite region/layer properties" of Comparative Example 3 is "-" means that both the "composite region depth" and the "distance from the outermost contour line" were zero, i.e., conventional partition walls where no particle deposits.

Comparative Example 4 to 7

In the same manner, after the honeycomb segments (composite region-formed bodies) which were the same as those in Example 2 except for the average particle diameter of 0.5 μm as a composite region/layer property were obtained, a honeycomb filter was obtained through the same steps as in Example 1. This filter was employed as Comparative Example 4. In the same manner, after the honeycomb segments (composite region-formed articles) which were the same as those in Example 2 except for the average particle diameter of 0.8 μm as a composite region/layer property were obtained, a honeycomb filter was obtained through the same steps as in Example 1. This filter was determined as Comparative Example 5. In the same manner, after the honeycomb segments (composite region-formed bodies) which were the same as those in Example 2 except for the average particle diameter of 18 μm as a composite region/layer property were obtained, a honeycomb filter was obtained through the same steps as in Example 1. This filter was employed as Comparative Example 6. In the same manner, after the honeycomb segments (composite region-formed articles) which were the same as those in Example 2 except for the distance from the outermost contour of 82 μm as a composite region/layer property were obtained, a honeycomb filter was obtained through the same steps as in Example 1. The filter was employed as Comparative Example 7. Thus, the Comparative Examples 4 to 7 were subjected to the aforementioned experiments [1] to [3]. The results are shown in Table 1.

Comparative Example 8 to 11

In addition, after the honeycomb segments (composite region-formed bodies) which were the same as those in Example 2 except for the porosity of 33% as a partition wall property were obtained with adjusting the particle diameter distribution (sharp, broad, two distribution) and adjusting the pore former (particle diameter, particle diameter distribution, addition amount), a honeycomb filter was obtained through the same steps as in Example 1. This filter was determined as Comparative Example 8. In the same manner, after the honeycomb segments (composite region-formed bodies) which were the same as those of Example 2 except that the porosity was 78% and that the average particle diameter was 20 μm as partition wall properties were obtained, a honeycomb filter was obtained through the same steps as in Example 1. This was employed as Comparative Example 9. In the same manner, after the honeycomb segments (composite region-formed bodies) which were the same as those of Example 2 except that the average pore diameter was 4 μm and that the average particle diameter was 10 μm as partition wall properties were obtained, a honeycomb filter was obtained through the same steps as in Example 1. This was employed as Comparative Example 10. In the same manner, after the honeycomb segments (composite region-formed articles) which were the same as those of Example 2 except that the average pore diameter was 43 μm and that the average particle diameter was 65 μm as partition wall properties were obtained, a honeycomb filter was obtained through the same steps as in Example 1. This was employed as Comparative Example 11. Thus, Comparative Examples 8 to 11 were subjected to the aforementioned experiments [1] to [3]. Further, Comparative Examples 8 and 9 were subjected to the aforementioned experiment [4]. The results are shown in Table 2.

(Discussion)

As shown in Table 1, good results could be obtained in Examples. On the other hand, in Comparative Example 3, since the composite region was not formed in the partition walls, it was confirmed that pressure loss with soot is high and that the trapping efficiency is low. In addition, in Comparative Examples 1 and 2, since the rate of composite region depth was 0, a dense layer of only simulated ash particles was formed on the partition wall surface layer. Therefore, the gas permeability remarkably fell, and the rate of causing the initial pressure loss and pressure loss with soot rose to a large extent. Incidentally, in Example 6, the composite region became too large, and, as a result, the rate of clogging partition wall pores became high. Therefore, the gas permeability became small, and the pressure loss incidence rate of the partition walls rose. However, since it was well balanced in comparison with other Comparative Examples, it is included in Examples in this regard. In addition, in Comparative Examples 4 and 5, diameter of the particles forming the composite was too small, and the particles aggregated and were densified. Therefore, the gap permeability fell, and the rate of causing the partition wall pressure loss rose. Further, in Comparative Example 6, the pressure loss incidence rate of the partition walls rose. Further, in Comparative Example 6, since the particle diameter was too large, partition wall open pores could not be clogged efficiently. Therefore, sufficient trapping efficiency could not be obtained. In addition, in Comparative Example 7, since the distance of the deposited particles from the outermost contour is large, the region where the composite forming particles having small diameters bond to each other became extremely large. Therefore, the effective volume of exhaust gas inflow side cells became small, and the line resistance when exhaust gas passes through the cells rose, and the pressure loss incidence rate of partition walls rose. In Comparative Example 8, porosity was too low, and the pore passages became small. Therefore, the gas permeability fell, and the pressure loss incidence rate of the partition walls rose. In Comparative Example 9, since the porosity was too high, the isostatic strength fell. When it is 1.0 or less, there is a high possibility that a crack is caused upon canning. In addition, in Comparative Example 10, since pores were small, the gas permeability became small, and the pressure loss incidence rate of the partition walls rose. In addition, in Comparative Example 11, the pore size was too large to sufficiently clog the pores even when the composite region was formed. Therefore, the trapping efficiency was not sufficient. Thus, in the Comparative Examples, it was confirmed that a defect was easily caused and that operability was low.

INDUSTRIAL APPLICABILITY

A honeycomb filter of the present invention can suitably be used for trapping or cleaning up particulates contained in exhaust gas discharged from an internal combustion engine such as a diesel engine, an ordinary vehicle engine, and an engine of a large automobile such as a truck and a bus or various combustion apparatuses.

DESCRIPTION OF REFERENCE NUMERAL 1, 1A: honeycomb filter, 3: cell, 4: partition wall, 4a: surface layer portion (composite region), 4b: particles constituting partition walls, 5: particles (to be deposited), 7: open pore, 9: gap between particles, ha: open end portion on one side, 11b: open end portion, 13: plugging portion, 17: outermost contour, 62: honeycomb segment, 63: honeycomb segment bonded body, 64: bonding material, 66: outer periphery coat layer, 115: inlet layer, 117: soot, G, G1, G2: exhaust gas, N: neck portion, R1, R2: particle, Z1: exhaust gas inflow side, Z2: midflow portion (mid-flow region), Z3: exhaust gas outflow side

The invention claimed is:

1. A honeycomb filter comprising a honeycomb-structured substrate provided with a plurality of cells separated by partition walls of porous ceramic having pores and functioning as exhaust gas passages, the honeycomb-structured substrate having an exhaust gas inflow side and an exhaust gas outflow side,
wherein plugging portions are formed alternately in one side open end portions and the other side open end portions of the plural cells,
at least in open pores formed by the particles constituting the partition walls and/or gaps between the particles, a composite region is formed by depositing particles having an average particle diameter smaller than that of the particles in a surface layer portion of the partition walls on the exhaust gas inflow side,
the partition walls have an average pore diameter of 5 to 40 μm and a porosity of 35 to 75%,
the particles deposited have an average particle diameter of 1 to 15 μm, and
the composite region has a height of 80 μm or less with respect to the partition wall surface direction from the outermost contour line of the partition walls.

2. The honeycomb filter according to claim 1, wherein the particles having an average particle diameter smaller than the average size of the open pores formed by the particles constituting the partition walls and/or gaps between the particles are deposited to form the composite region.

3. The honeycomb filter according to claim 1, wherein the composite region is formed in the open pores and/or the gaps between the particles in the range from a surface layer reference line of the partition walls on the exhaust gas inflow side to a position of 30% of the partition wall thickness.

4. The honeycomb filter according to claim 1, wherein the composite region is formed in the open pores and/or the gaps between the particles in the range from a surface layer reference line of the partition wall on the exhaust gas inflow side to a position of the depth of at most 4 times the average pore diameter of the partition walls.

5. The honeycomb filter according to claim 1, wherein the particles deposited in the open pores and/or the gaps between the particles are formed of the same material as that for the particles constituting the partition walls.

6. The honeycomb filter according to claim 1, wherein the particles constituting the partition walls are formed of silicon carbide or a composite material of silicon carbide and silicon.

7. The honeycomb filter according to claim 1, wherein the particles deposited in the open pores and/or the gaps between the particles are bonded by a bonding phase different from the framework particles constituting the partition walls.

8. The honeycomb filter according to claim 1, wherein the particles deposited in the open pores and/or the gaps between the particles are bonded by a silica phase.

9. The honeycomb filter according to claim 1, wherein a catalyst is loaded on a part of or the entire portion of the partition walls and/or a part of or the entire portion of the composite region.

10. The honeycomb filter according to claim 1, wherein the composite region has a height of at least 5 μm to 80 μm or less with respect to the partition wall surface direction from the outermost contour line of the partition wall.

11. A method for producing a honeycomb filter, the method comprising:
forming a honeycomb formed body by subjecting a forming raw material containing a ceramic raw material to extrusion forming and forming plugging portions alternately in one side open end portions and the other side open end portions of the plural cells of the honeycomb formed body,
firing the honeycomb formed body to form a honeycomb fired body, supplying particles having an average particle diameter smaller than that of the particles constituting the partition walls from the one side open end portions of the honeycomb fired body by a solid-gas two-phase flow, and at least in open pores formed by the particles constituting the partition walls and/or gaps between the particles, forming a composite region by depositing particles having an average particle diameter smaller than that of the particles in a surface layer portion of the partition walls on the exhaust gas inflow side;

wherein the partition walls have an average pore diameter of 5 to 40 μm and a porosity of 35 to 75%, the particles deposited have an average particle diameter of 1 to 15 μm, and the composite region has a height of 80 μm or less with respect to the partition wall surface direction from the outermost contour line of the partition walls.

12. The method for producing a honeycomb filter according to claim 11, wherein the method comprises:

supplying particles having an average particle diameter smaller than that of the particles constituting the partition walls from one side open end portion of the honeycomb fired body, and simultaneously, sucking the particles from the other open end portions of the honeycomb fired article to deposit the particles in the pores formed in the partition walls on the exhaust gas inflow side to form a composite region.

13. A method for producing a honeycomb filter, the method comprising:

forming a honeycomb formed body by subjecting a forming raw material containing a ceramic raw material to extrusion forming and forming plugging portions alternately in one side open end portions and the other side open end portions of the plural cells of the honeycomb formed body, firing the honeycomb formed body to form a honeycomb fired body, supplying particles having an average particle diameter smaller than that of the particles constituting the partition walls from the one side open end portions of the honeycomb fired body by a solid-gas two-phase flow, at least in open pores formed by the particles constituting the partition walls and/or gaps between the particles, forming a composite region by depositing particles having an average particle diameter smaller than that of the particles in a surface layer portion of the partition walls on the exhaust gas inflow side, and further performing a thermal treatment;

wherein the partition walls have an average pore diameter of 5 to 40 μm and a porosity of 35 to 75%, the particles deposited have an average particle diameter of 1 to 15 μm, and the composite region has a height of 80 μm or less with respect to the partition wall surface direction from the outermost contour line of the partition walls.

14. The method for producing a honeycomb filter according to claim 13, wherein the method comprises:

supplying particles having an average particle diameter smaller than that of the particles constituting the partition walls from one side open end portion of the honeycomb fired body, and simultaneously, sucking the particles from the other open end portions of the honeycomb fired article to deposit the particles in the pores formed in the partition walls on the exhaust gas inflow side to form a composite region.

15. A method for producing a honeycomb filter, the method comprising:

forming a honeycomb formed body by subjecting a forming raw material containing a ceramic raw material to extrusion forming and forming plugging portions alternately in one side open end portions and the other side open end portions of the plural cells of the honeycomb formed body, firing the honeycomb formed body to form a honeycomb fired body, loading a catalyst on the partition walls of the honeycomb fired body to obtain a catalyst-loaded honeycomb-structured body, supplying particles having an average particle diameter smaller than that of the particles constituting the partition walls from the one side open end portions of the honeycomb-structured body with the catalyst by a solid-gas two-phase flow, at least in open pores formed by the particles constituting the partition walls and/or gaps between the particles, forming a composite region by depositing particles having an average particle diameter smaller than that of the particles in a surface layer portion of the partition walls on the exhaust gas inflow side, and further performing a thermal treatment;

wherein the partition walls have an average pore diameter of 5 to 40 μm and a porosity of 35 to 75%, the particles deposited have an average particle diameter of 1 to 15 μm, and the composite region has a height of 80 μm or less with respect to the partition wall surface direction from the outermost contour line of the partition walls.

16. The method for producing a honeycomb filter according to claim 15, wherein the method comprises:

supplying particles having an average particle diameter smaller than that of the particles constituting the partition walls from one side open end portion of the honeycomb fired body, and simultaneously, sucking the particles from the other open end portions of the honeycomb fired article to deposit the particles in the pores formed in the partition walls on the exhaust gas inflow side to form a composite region.

* * * * *